United States Patent
Murayama

(10) Patent No.: US 8,740,745 B2
(45) Date of Patent: Jun. 3, 2014

(54) VEHICLE DRIVE DEVICE

(75) Inventor: Mai Murayama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 62 days.

(21) Appl. No.: 13/636,261

(22) PCT Filed: Mar. 23, 2011

(86) PCT No.: PCT/JP2011/056999
§ 371 (c)(1),
(2), (4) Date: Sep. 20, 2012

(87) PCT Pub. No.: WO2012/127656
PCT Pub. Date: Sep. 27, 2012

(65) Prior Publication Data
US 2013/0066529 A1   Mar. 14, 2013

(51) Int. Cl.
*H02P 15/00* (2006.01)
*B60W 10/02* (2006.01)
*B60W 10/08* (2006.01)
*B60W 10/04* (2006.01)
*B60W 20/00* (2006.01)

(52) U.S. Cl.
USPC .................. 477/8; 477/5; 477/6; 180/65.285

(58) Field of Classification Search
USPC ...................... 477/5, 6, 8, 13, 15; 180/65.285
See application file for complete search history.

(56) References Cited

U.S. PATENT DOCUMENTS

| 5,942,879 A | * | 8/1999 | Ibaraki | 322/16 |
| 6,524,215 B1 | * | 2/2003 | Schmidt | 477/3 |
| 6,601,668 B2 | | 8/2003 | Kitai et al. | |
| 7,156,771 B2 | * | 1/2007 | Teraoka | 477/5 |
| 7,377,877 B2 | * | 5/2008 | Ogata | 477/3 |
| 2007/0272046 A1 | | 11/2007 | Kawamoto et al. | |
| 2007/0278022 A1 | * | 12/2007 | Tanishima | 180/65.2 |

FOREIGN PATENT DOCUMENTS

| EP | 1860353 A1 | 11/2007 |
| JP | 60-127232 U | 8/1985 |
| JP | 5-044832 A | 2/1993 |
| JP | 10-109558 A | 4/1998 |
| JP | 2002-264685 A | 9/2002 |
| JP | 2004-204960 A | 7/2004 |
| JP | 2006-007989 A | 1/2006 |
| JP | 2007-131107 A | 5/2007 |
| JP | 2007-255566 A | 10/2007 |
| JP | 2007-315444 A | 12/2007 |
| JP | 2010-120543 A | 6/2010 |

* cited by examiner

*Primary Examiner* — Tisha Lewis
(74) *Attorney, Agent, or Firm* — Sughrue Mion, PLLC

(57) ABSTRACT

In a vehicle drive device including a transmission mechanism 54, a range changing mechanism 55, a motor generator MG1 or MG2, and a control device 200, 300, when a clutch sleeve 553 becomes unable to slide during a range changing process, the clutch sleeve 553 is restored as quickly as possible so that the clutch sleeve 553 can slide, whereby changing of ranges can be completed. The control device 200, 300 causes a connection target gear piece 551 or 552 to rotate in the same direction as the direction of input rotation to the transmission mechanism 54 in response to a range change request, and causes the clutch sleeve 553 to slide. When determining that the clutch sleeve 553 has become unable to slide during the range change process, the control device 200, 300 causes the motor generator MG1 or MG2 to rotate the connection target gear piece 551 or 552 in a direction opposite to the direction of input rotation to the transmission mechanism 54.

9 Claims, 15 Drawing Sheets

| | | Low | ←→ | N | ←→ | High |
|---|---|---|---|---|---|---|
| HL1 | ON OFF | | | | | |
| HL2 | ON OFF | | | | | |
| HL3 | ON OFF | | | | | |

(clutch sleeve becomes unable to slide during range changing process)

(enabled to slide)

(clutch sleeve becomes unable to slide during range changing process)

VEHICLE DRIVE DEVICE

CROSS REFERENCE TO RELATED APPLICATIONS

This application is a National Stage of International Application No. PCT/JP2011/056999 filed on Mar. 23, 2011, the contents of all of which are incorporated herein by reference in their entirety.

TECHNICAL FIELD

The present invention relates to a vehicle drive device that includes a transmission mechanism that selectively establishes one of a low range and a high range, a range changing mechanism that changes the ranges of the transmission mechanism, a motor generator that inputs drive force to the transmission mechanism, and a control device that controls the changing of the ranges.

BACKGROUND ART

A transmission mechanism included in a conventional vehicle drive device is capable of changing the speed range between a low range (L) and a high range (H) in response to, for example, a driver's operation of a range changing switch etc. (see, for example, Patent Literatures 1 and 2).

The transmission mechanism changes the ranges by, for example, sliding a clutch sleeve in the direction of an output shaft thereof and thereby connecting the clutch sleeve to a low gear or a high gear. The clutch sleeve is mounted externally around the output shaft of the transmission mechanism in a manner that allows the clutch sleeve to rotate together with the output shaft and moved in the axial direction.

The low and high gears each have, on the outer circumference thereof, a plurality of teeth (splines) that are circumferentially arranged and equally spaced. The clutch sleeve has, on the inner circumference thereof, a plurality of teeth (splines) that can be engaged with the teeth (splines) of the gears. When the inner teeth (splines) of the clutch sleeve are engaged (fitted) with the outer teeth (splines) of the low- or high gear, the clutch sleeve is connected to the low- or high gear.

When the clutch sleeve is slid in one direction along the shaft to be connected to the low gear, a power transfer path is established through which low-speed rotational power is transmitted from the low gear and the clutch sleeve to the output shaft, resulting in the "low range."

When the clutch sleeve is slid in the opposite direction along the shaft to be connected to the high gear, a power transfer path is established through which high-speed rotational power is transmitted from the high gear and the clutch sleeve to the output shaft, resulting in the "high range." Note that when the clutch sleeve is in neutral position in which the clutch sleeve is connected neither to the low gear nor to the high gear, a neutral range state is established in which rotational power is not transmitted.

Typically, the tooth tip of the clutch sleeve and the tooth tips of the low and high gears have a bevel called a chamfer. The chamfer allows teeth to smoothly engage with each other.

As is known in the art, the chamfer includes a double chamfer (e.g., the tooth tip is beveled into a pointed shape, such as an isosceles triangle, as viewed from the top), and a single chamfer (e.g., the tooth tip is diagonally beveled into a shape, such as a right triangle, as viewed from the top). Note that, for example, if forward rotational power (forward torque) is mostly required, the single chamfer is employed to improve the ability of the clutch sleeve to engage with another component.

Incidentally, consider that the ranges are changed while the output shaft of the transmission mechanism is stopped, for example, when a vehicle is stopped. When the clutch sleeve is slid in order to change the ranges, the tooth tip of the clutch sleeve may abut the tooth tip of the low gear or the high gear, so that the clutch sleeve may not be further slid, and therefore, the current range may not be changed to the target range.

In Patent Literature 1, as described in paragraphs 0031-0037, when the clutch sleeve becomes unable to slide and gets stuck, the clutch sleeve is slid to return to a range position that was before trying to change the ranges for the purpose of preventing the clutch sleeve from being left in the stuck position for a long time.

In Patent Literature 2, as described in FIGS. 3 and 4 and paragraphs 0014-0019, for the purpose of preventing the sleeve from being stopped somewhere (a neutral position) between the high-speed side and the low-speed side during changing of the ranges, the sleeve is slid by high energy that is accumulated to a level sufficient to move the sleeve from the high-speed side to the low-speed side or from the low-speed side to the high-speed side.

CITATION LIST

Patent Literature

[PTL 1] JP 2006-007989 A
[PTL 2] JP H10-109558 A

DISCLOSURE OF INVENTION

Technical Problems

In Patent Literature 1, when the clutch sleeve becomes unable to slide and gets stuck, the clutch sleeve is slid to return to a range position that was before trying to change the ranges for the purpose of preventing the clutch sleeve from being left in the stuck position for a long time. Therefore, in this case, the range cannot be changed to the target range.

On the other hand, in Patent Literature 2, even when the sleeve is slid by high accumulated energy, then if the tooth tip of the sleeve and the tooth tip of the low gear or the high gear are positioned at the same phase, these tooth tips abut each other, so that the sleeve may become unable to slide.

In view of the above circumstances, it is an object of the present invention to provide a vehicle drive device that includes a transmission mechanism that selectively establishes one of a low range and a high range, a range changing mechanism that changes the ranges of the transmission mechanism, a motor generator that inputs drive force to the transmission mechanism, and a control device that controls the changing of the ranges. In the vehicle drive device, when a clutch sleeve becomes unable to slid during a range changing process, the clutch sleeve is caused to be able to slide as quickly as possible so that the changing of the ranges can be completed.

Means for Solving the Problems

In a vehicle drive device including a transmission mechanism that selectively establishes one of a low range and a high range, a range changing mechanism that changes the ranges of the transmission mechanism, a motor generator that inputs drive force to the transmission mechanism, and a control device that controls the changing of the ranges, the present invention has the following configuration.

The range changing mechanism includes a low gear piece and a high gear piece that are arranged and spaced apart in an axial direction, a clutch sleeve that is slidably arranged in the axial direction so as to be engaged with one of the two gear pieces, and a shift actuator that slides the clutch sleeve either forward or backward in the axial direction to be connected to one of the gear pieces. When the clutch sleeve is connected to the low gear piece, a low-range power transfer path is established, and when the clutch sleeve is connected to the high gear piece, a high-range power transfer path is established.

The control device includes an actuation processor that rotates the connection target gear piece in the same direction as a direction of input rotation to the transmission mechanism in response to a range change request when a vehicle is stopped, and slides the clutch sleeve, a determination processor that determines whether or not the clutch sleeve has become unable to slide during the process of sliding the clutch sleeve, and a handler that, when the determination processor determines that the clutch sleeve has become unable to slide, causes the motor generator to rotate the connection target gear piece in a direction opposite to the direction of the input rotation to the transmission mechanism.

With the configuration, when the clutch sleeve becomes unable to slide during a range changing process of sliding the clutch sleeve, the connection target gear piece is rotated in a direction opposite to the direction of input rotation to the transmission mechanism.

Here, if a cause why the clutch sleeve becomes unable to slide is, for example, that the tooth tips of the clutch sleeve and the connection target gear piece abut each other, the clutch sleeve is rotated in the opposite direction, so that the tooth tip of the connection target gear piece is displaced from the tooth tip of the clutch sleeve in a circumferential direction.

As a result, the clutch sleeve is restored as quickly as possible so that the clutch sleeve can slide, and therefore, the clutch sleeve is allowed to engage with the connection target gear piece, whereby the changing of the ranges can be completed.

Thus, when the clutch sleeve becomes unable to slide, the cause is removed as quickly as possible so that the clutch sleeve can slide. As a result, the reliability of the range changing operation can be improved.

Preferably, the actuation processor causes the motor generator to rotate the connection target gear piece in the same direction as the direction of the input rotation to the transmission mechanism in response to the range change request, before causing the shift actuator to slide the clutch sleeve.

Here, an actuation source for the gear piece and an actuation source for the clutch sleeve are specified, whereby the embodiment is clarified.

Incidentally, in the vehicle drive device, a second motor generator and a main transmission mechanism may be provided between the motor generator and an input shaft of the transmission mechanism, and an engine may be provided between the second motor generator and the motor generator via a power split device.

Here, the vehicle drive device includes the second motor generator, the main transmission mechanism, the power split device, and the engine in addition to the motor generator (first motor generator), the transmission mechanism (sub-transmission mechanism), the range changing mechanism, and the control device.

Also, in the vehicle drive device, a main transmission mechanism with a torque converter may be provided between an input shaft of the transmission mechanism and an output shaft of the motor generator, and an engine may be provided upstream from the motor generator via a clutch.

Here, the vehicle drive device includes the main transmission mechanism with a torque converter, the clutch, and the engine in addition to the motor generator, the transmission mechanism, the range changing mechanism, and the control device.

In the vehicle drive device thus configured, the actuation processor preferably causes the connection target gear piece to rotate in the same direction as the direction of the input rotation to the transmission mechanism by dragging torque of the torque converter in response to the range change request, before causing the shift actuator to slide the clutch sleeve.

Here, an actuation source for the gear piece and an actuation source for the clutch sleeve are specified, whereby the embodiment is clarified. Note that, in order to produce the dragging torque of the torque converter, it is necessary to actuate the engine, connecting the clutch, and causing the main transmission mechanism with a torque converter to be in the drive range.

Preferably, the shift actuator includes a shift fork shaft that allows the clutch sleeve to slide, a shift motor that generates rotational power, a power transfer mechanism that moves the shift fork shaft in an axial direction thereof using the rotational power generated by the shift motor, a low range detection element that outputs low range establishment information when a rotation angle of an output shaft of the shift motor reaches an angle at which the clutch sleeve is completely engaged with the low gear piece, and a high range detection element that outputs high range establishment information when the rotation angle of the output shaft of the shift motor reaches an angle at which the clutch sleeve is completely engaged with the high gear piece. The determination processor determines whether or not a target range has been established, based on output information from the detection elements, before a predetermined period of time has elapsed since reception of the range change request, and if the result of the determination is negative, determines that the clutch sleeve has become unable to slide.

Here, a specific configuration of the shift actuator is provided, and a specific requirement for the determination by the determination processor is provided.

Preferably, the transmission mechanism is a planetary gear set including a sun gear that receives input rotation, a non-rotating ring gear, a plurality of pinion gears provided between and engaged with the sun gear and the ring gear, and a carrier that supports the pinion gears in a manner that allows the pinion gears to rotate freely and is rotated in synchronization with an orbital motion of the pinion gears. The carrier is allowed to rotate together with the low gear piece, and the sun gear is allowed to rotate together with the high gear piece.

Here, a specific configuration of the transmission mechanism is provided. In the configuration, when the sun gear and the high gear piece are rotated in the positive rotation direction by the input rotation to the transmission mechanism, the pinion gears perform an orbital motion (revolution) while rotating in the same direction as that of the sun gear, whereby the carrier and the low gear piece rotate in synchronization with the orbital motion (revolution) of the pinion gears. Thus, the specific configuration of the transmission mechanism clarifies that the low and high gear pieces are rotated in the same direction as that of the input rotation to the transmission mechanism.

Preferably, the low gear piece is a gear with inner teeth, the high gear piece is a gear with outer teeth and provided inside the low gear piece without making contact with the low gear piece, and the clutch sleeve includes outer teeth that are allowed to engage with the inner teeth of the low gear piece and inner teeth that are allowed to engage with the outer teeth of the high gear piece.

With the configuration, specific positions where the teeth of the low gear piece, the high gear piece, and the clutch sleeve are formed are provided, and a specific relative position relationship between the low gear piece and the high gear piece is provided.

Effects of the Invention

According to the present invention, in a vehicle drive device including a transmission mechanism that selectively establishes one of a low range and a high range, a range changing mechanism that changes the ranges of the transmission mechanism, a motor generator that inputs drive force to the transmission mechanism, and a control device that controls the changing of the ranges, when a clutch sleeve becomes unable to slide during a range changing process, the clutch sleeve is restored as quickly as possible so that the clutch sleeve can slide, whereby the changing of the ranges can be completed.

Therefore, in the vehicle drive device according to the present invention, the reliability of the range changing operation of the transmission mechanism can be improved.

BRIEF DESCRIPTION OF DRAWINGS

FIG. 1 is a diagram schematically showing a configuration of a vehicle drive device according to an embodiment of the present invention.
FIG. 2 is a diagram schematically showing a configuration of a hybrid transmission and a transfer of FIG. 1.
FIG. 3 is a cross-sectional view showing a specific configuration of a sub-transmission mechanism and a range changing mechanism of the transfer of FIGS. 1 and 2.
FIG. 4 is an enlarged view of the sub-transmission mechanism and the range changing mechanism of FIG. 3, showing a clutch sleeve in a neutral position (neutral range).
FIG. 5 is a diagram showing the range changing mechanism of FIG. 4 in a low range.
FIG. 6 is a diagram showing the range changing mechanism of FIG. 4 in a high range.
FIG. 7 is a partially transparent view of a transfer shift actuator.
FIG. 8 is a diagram showing a configuration of a limit switch of the transfer shift actuator of FIG. 7.
FIG. 9 is a diagram showing an electrical circuit representing the limit switch of FIG. 8.
FIG. 10 is a table showing a relationship between combinations of "on" and "off" of first to third contact points of the limit switch of FIG. 8 and established ranges of the sub-transmission mechanism.
FIG. 11 is a flowchart for describing a range changing control of the sub-transmission mechanism of FIG. 1.
FIG. 12 is a developed view of inner teeth of the low gear piece and outer teeth of the clutch sleeve in FIG. 4, as viewed from the outside (outer circumference side), showing an initial step of changing the speed range to the low range.
FIG. 13 is a diagram showing a situation that, during the process of changing the speed range to the low range, the tooth tips of inner teeth of the low gear piece abut the tooth tips of outer teeth of the clutch sleeve, so that the clutch sleeve becomes unable to slide.
FIG. 14 is a diagram showing an operation that restores the clutch sleeve of FIG. 13 so that the clutch sleeve can slide.
FIG. 15 is a developed view of outer teeth of the high gear piece and inner teeth of the clutch sleeve in FIG. 4, as viewed from the outside (outer circumference side), showing an initial step of changing the speed range to the high range.
FIG. 16 is a diagram showing a situation that, during the process of changing the speed range to the high range, the tooth tips of outer teeth of the high gear piece abut the tooth tips of inner teeth of the clutch sleeve, so that the clutch sleeve becomes unable to slide.
FIG. 17 is a diagram showing an operation that restores the clutch sleeve of FIG. 16 so that the clutch sleeve can slide.
FIG. 18 is a diagram schematically showing a configuration of a vehicle drive device according to another embodiment of the present invention.
FIG. 19 is a diagram schematically showing a configuration of a vehicle drive device according to still another embodiment of the present invention.

MODE FOR CARRYING OUT THE INVENTION

Best modes for carrying out the present invention will be described in detail hereinafter with reference to the accompanying drawings.

FIGS. 1-17 show an embodiment of the present invention. Firstly, a general configuration of a vehicle drive device according to the embodiment of the present invention will be described with reference to FIG. 1. In this embodiment, a part-time four-wheel-drive hybrid vehicle drive device will be illustrated. The hybrid vehicle drive device has the same basic configuration as that of a front-engine rear-wheel-drive (FR) vehicle drive device.

Figure 1:
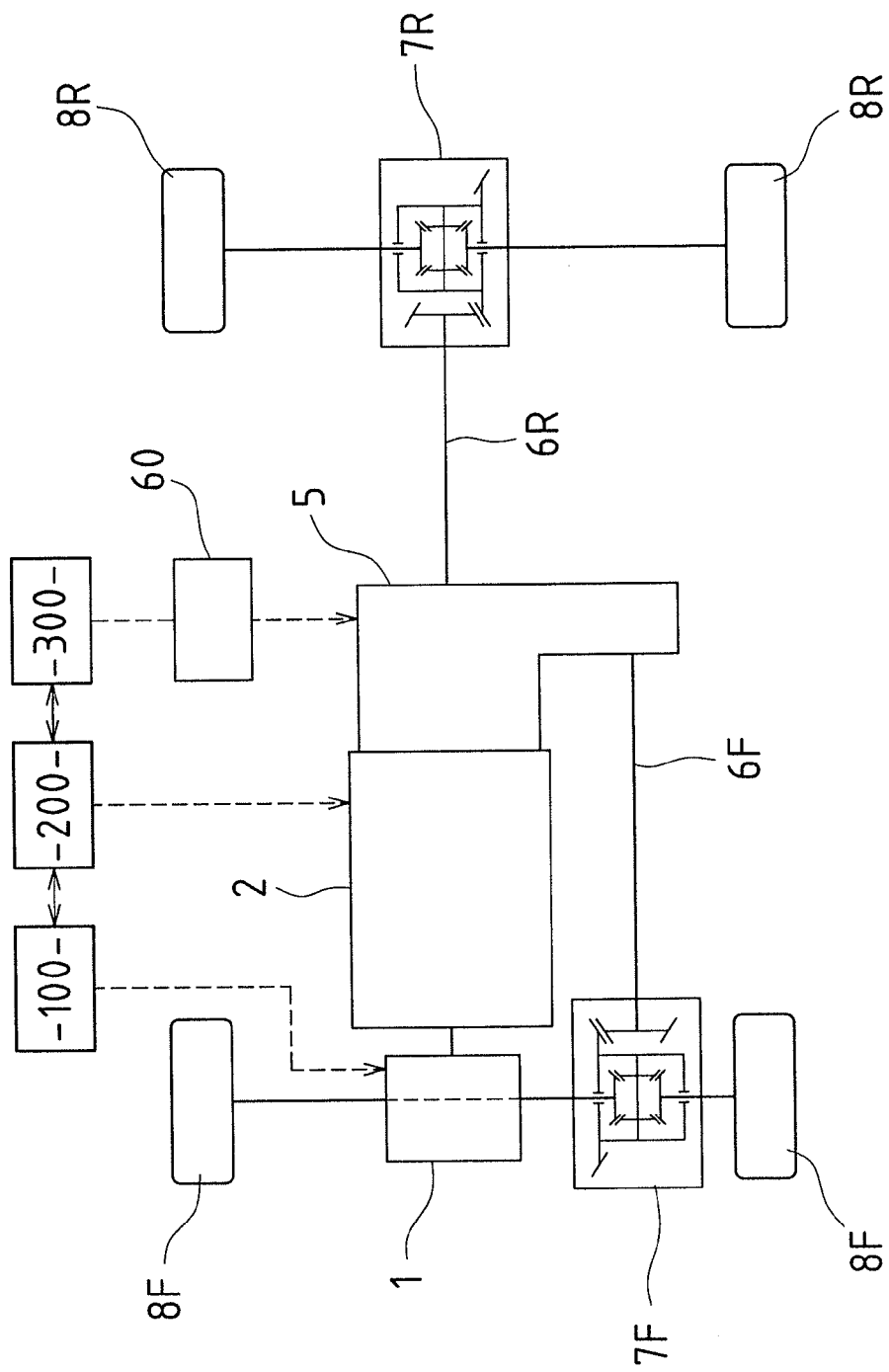
[FIG. 1]

The vehicle drive device of FIG. 1 includes an engine 1, a hybrid transmission 2, a transfer 5, a front propeller shaft 6F, a rear propeller shaft 6R, a front differential 7F, a rear differential 7R, front wheels 8F, and rear wheels 8R. While these components will be described hereinafter, components that are not directly related to the features of the present invention will be schematically shown and briefly described.

—Engine—

The engine 1 is a known drive source that burns fuel, such as a gasoline engine, a diesel engine, etc., to output power. The operating state of the engine 1 is controlled by an engine control computer 100 managing the degree of opening of the throttle (the amount of intake gas), the amount of fuel injected, the timing of ignition, etc.

A crank shaft (output shaft) 11 of the engine 1 is connected via a damper 12 to a power split device 3. Note that the damper 12 is a device for absorbing variations in the torque of the engine 1.

—Hybrid Transmission—

Figure 2:
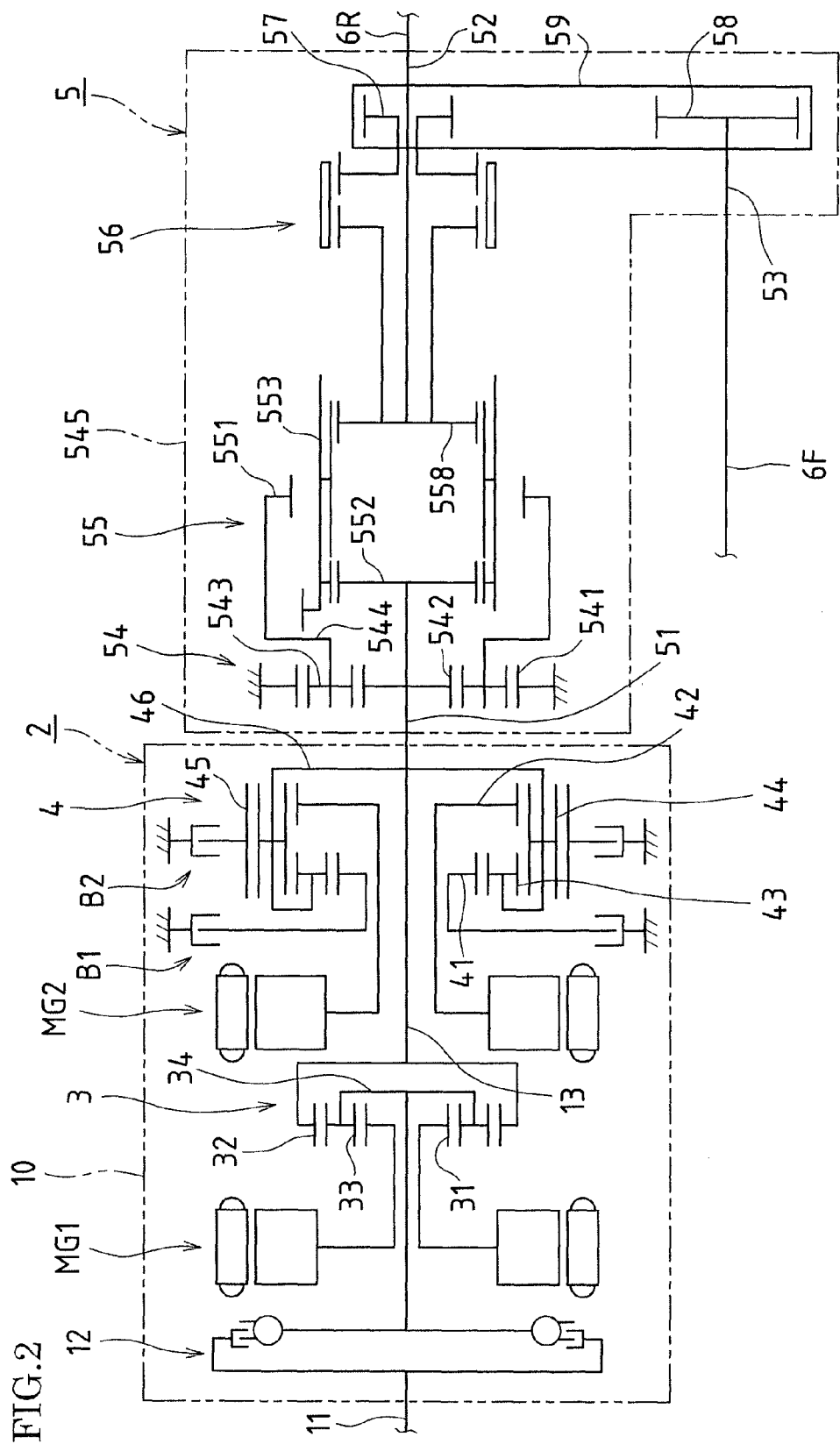
[FIG. 2]

As shown in FIG. 2, the hybrid transmission 2 includes a first motor generator MG1, a second motor generator MG2, the power split device 3, a main transmission mechanism 4, etc.

—Motor Generator—

The first and second motor generators MG1 and MG2 are both an alternating-current synchronous motor, which functions as a motor and also serves as a generator.

The first and second motor generators MG1 and MG2 are each connected via an inverter to a battery (electricity storage device), although not shown. By controlling the inverter using a power management control computer 200, the motor generators MG1 and MG2 are switched between the regeneration and motoring (power assist) modes. Regenerated power is stored via the inverter to the battery. Power for driving the first and second motor generators MG1 and MG2 is supplied from the battery via the inverter thereto.

—Power Split Device—

The power split device 3 includes, as a major component, a single pinion type planetary gear set that includes a sun gear (a gear with outward-facing teeth (outer teeth)) 31, a ring gear (a gear with inward-facing teeth (inner teeth)) 32, a plurality of pinion gears (gears with outward-facing teeth (outer teeth)) 33, a carrier 34, etc.

The ring gear 32 is provided around the outer circumference of the sun gear 31. The ring gear 32 and the sun gear 31 are concentrically arranged and spaced apart from each other. The pinion gears 33 are provided in an annular space between the sun gear 31 and the ring gear 32, engaging therewith. The carrier 34 supports the pinion gears 33 in a manner that allows the pinion gears 33 to rotate freely, and can rotate in synchronization with the orbital motion (revolution) of the pinion gears 33.

The carrier 34 is connected via the damper 12 to the crank shaft 11 of the engine 1. The sun gear 31 is connected to the rotor of the first motor generator MG1. A power transfer shaft 13 is connected to the ring gear 32. The power transfer shaft 13 is connected via the main transmission mechanism 4 to the second motor generator MG2. The power transfer shaft 13 is also connected to a transfer input shaft 51.

An operation of the power split device 3 thus configured will be described. When the first motor generator MG1 operates as a generator, power input from the engine 1 to the carrier 34 is split into power that is used via the sun gear 31 to drive the first motor generator MG1 as a generator and power that is used via the ring gear 32 to drive the wheels (the front and rear wheels 8F and 8R). On the other hand, when the first motor generator MG1 operates as a motor, power input from the engine 1 to the carrier 34 and power input from the first motor generator MG1 to the sun gear 31 are combined and then output to the ring gear 32.

—Main Transmission Mechanism—

The main transmission mechanism 4 is a two-step (high and low) reduction mechanism that includes a Ravigneaux planetary gear set as a major component. The main transmission mechanism 4 includes a front sun gear (a gear with outer teeth) 41, a rear sun gear (a gear with outer teeth) 42, a short pinion gear (a gear with outer teeth) 43, a long pinion gear (a gear with outer teeth) 44, a ring gear (a gear with inner teeth) 45, a carrier 46, etc.

The front sun gear 41 is engaged with the short pinion gear 43. The short pinion gear 43 is engaged with the long pinion gear 44. The long pinion gear 44 is engaged with the ring gear 45 and the rear sun gear 42. The ring gear 45 and the front and rear sun gears 41 and 42 are concentrically arranged and spaced apart from each other. The carrier 46 supports the short and long pinion gears 43 and 44 in a manner that allows the short and long pinion gears 43 and 44 to rotate freely, and can rotate in synchronization with the orbital motion (revolution) of the short and long pinion gears 43 and 44.

The carrier 46 is connected to the power transfer shaft 13 and the transfer input shaft 51. The rear sun gear 42 is connected to the rotor of the second motor generator MG2. The front sun gear 41 is supported by a transmission case 10 via a first brake B1. The ring gear 45 is supported by the transmission case 10 via a second brake B2.

Moreover, the main transmission mechanism 4 includes the first and second brakes B1 and B2 as switch elements for switching the gear ratio between a low range (low gear ratio) and a high range (high gear ratio). The brakes B1 and B2 are each, for example, a multi-plate or band hydraulic friction engaging element that produces engagement force with the pressure of hydraulic fluid. The brakes B1 and B2 are each configured so that the torque capacity varies continuously, depending on engagement pressure produced by a hydraulic actuator (not shown) etc.

When the first brake B1 is deactivated or disengaged, the front sun gear 41 is released from the non-rotating transmission case 10 so that the front sun gear 41 can rotate relatively. On the other hand, when the first brake B1 is actuated or engaged, the front sun gear 41 is connected to and integrated with the transmission case 10 so that the front sun gear 41 is not allowed to rotate. When the second brake B2 is deactivated or disengaged, the ring gear 45 is released from the transmission case 10 so that the ring gear 45 can rotate relatively. On the other hand, when the second brake B2 is actuated or engaged, the ring gear 45 is connected to and integrated with the transmission case 10 so that the ring gear 45 is not allowed to rotate.

Here, when the first brake B1 is deactivated (disengaged) and the second brake B2 is actuated (engaged), the ring gear 45 is not allowed to rotate, so that the carrier 46 and the power transfer shaft 13 rotate at low speed (low range) by the ring gear 45 and the rear sun gear 42 that is rotated by the second motor generator MG2. When the second brake B2 is deactivated (disengaged) and the first brake B1 is actuated (engaged), the carrier 46 and the power transfer shaft 13 rotate at high speed (high range) by the non-rotating front sun gear 41, the rear sun gear 42 rotated by the second motor generator MG2, and the non-rotating ring gear 45. Note that when both the brakes B1 and B2 are deactivated (disengaged), the carrier 46 and the power transfer shaft 13 is out of gear or in a neutral position (neutral range).

—Transfer—

Figure 3:
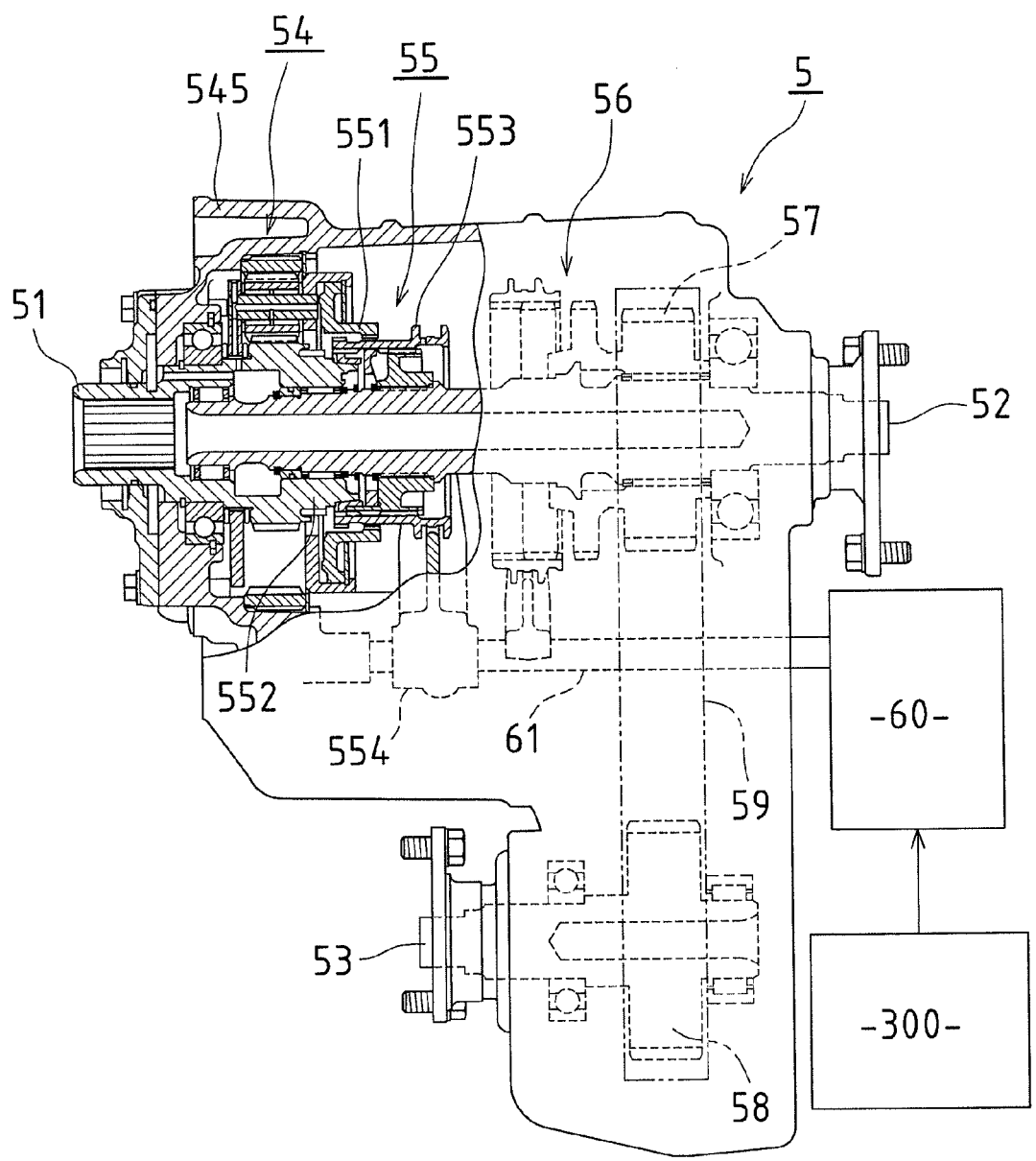
[FIG. 3]

As shown in FIGS. 2 and 3, the transfer 5 includes the transfer input shaft 51, a rear output shaft 52, a front output shaft 53, the sub-transmission mechanism 54, a range changing mechanism 55, a mode changing mechanism 56, etc.

The transfer input shaft 51 is supported by a transfer case 545 via a rolling-element bearing (not shown) in a manner that allows the transfer input shaft 51 to rotate freely. The transfer input shaft 51 receives rotational power output from the main transmission mechanism 4.

The rear output shaft 52, which is on the same axis as the transfer input shaft 51, outputs rotational power toward the rear wheels 8R. The front output shaft 53, which is parallel to the rear output shaft 52, outputs rotational power toward the front wheels 8F.

Note that a drive gear 57 is externally mounted on the rear output shaft 52 via a rolling-element bearing (not shown) called a cage and roller. A driven gear 58 is integrally formed on the outer circumference of the front output shaft 53. An endless member 59, such as a drive chain, a drive belt, etc., is wrapped and hung around the drive gear 57 and the driven gear 58.

—Sub-transmission Mechanism—

Figure 4:
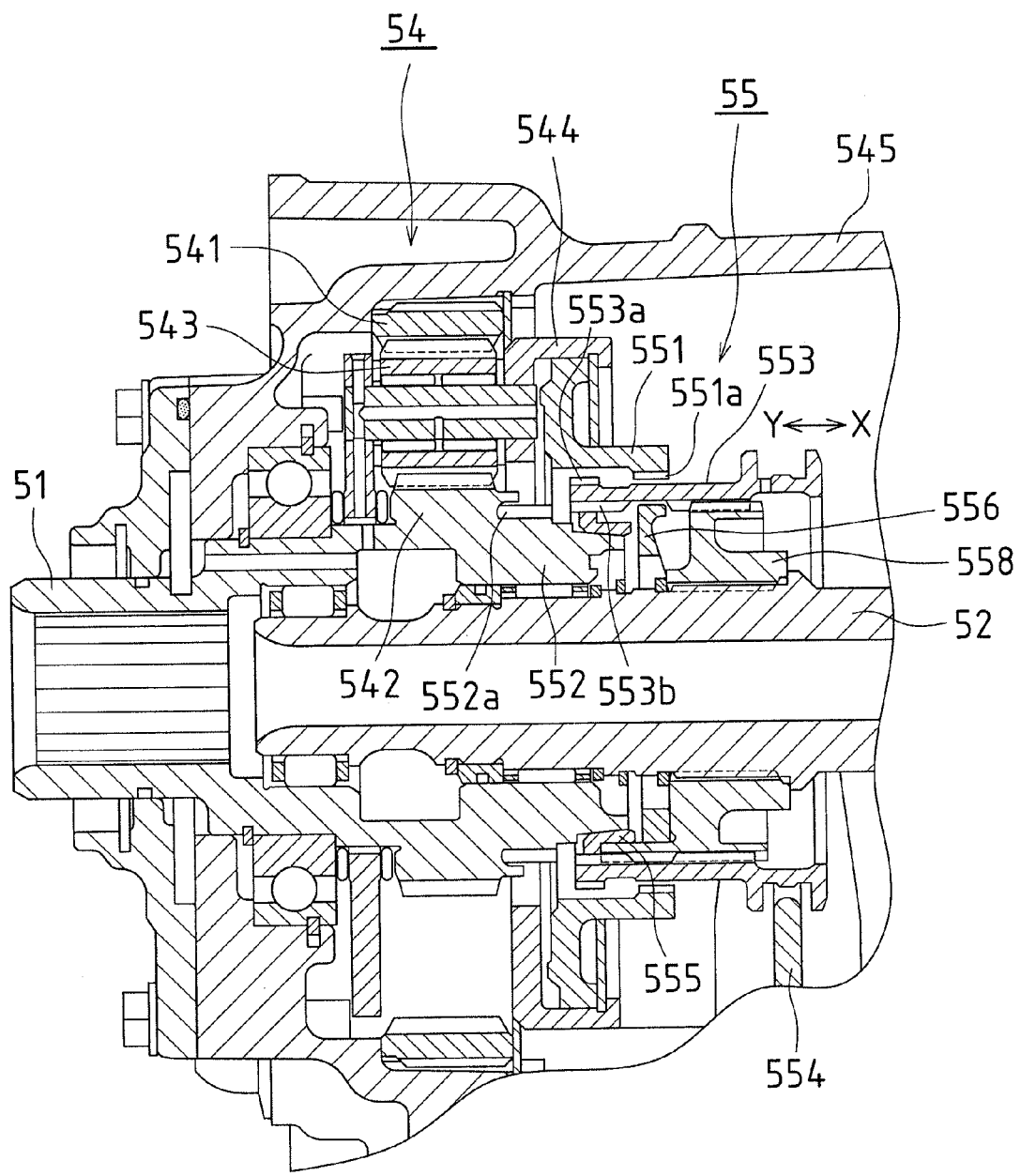
[FIG. 4]

As shown in FIGS. 2-4, the sub-transmission mechanism 54 is a two-step (high and low) reduction mechanism including a single pinion type planetary gear set as a major component. The sub-transmission mechanism 54 includes a ring gear (a gear with inner teeth) 541, a sun gear (a gear with outer teeth) 542, a plurality of pinion gears (gears with outer teeth) 543, a carrier 544, etc.

The ring gear 541 is fixed to the transfer case 545 so that the ring gear 541 is not allowed to rotate or axially move. The sun gear 542 is provided inside and spaced apart from the ring gear 541, and is connected to the transfer input shaft 51 so that the sun gear 542 can rotate together with the transfer input shaft 51. The pinion gears 543 are provided in an annular space between the ring gear 541 and the sun gear 542, engaging therewith. The carrier 544 supports the pinion gears 543 in a manner that allows the pinion gears 543 to rotate freely, and can rotate in synchronization with the orbital motion (revolution) of the pinion gears 543.

—Mode Changing Mechanism—

The mode changing mechanism 56 selectively establishes a four-wheel drive mode (4WD) or a two-wheel drive mode (2WD) in response to an operation that is performed by a driver using, for example, a drive mode changing switch (not shown) provided in the vicinity of a driver's seat (not shown).

In the four-wheel drive mode (4WD), a power transfer path is established through which the rotational power input to the transfer input shaft 51 is output from both the rear and front output shafts 52 and 53.

In the two-wheel drive mode (2WD), a power transfer path is established through which the rotational power input to the transfer input shaft 51 is output from only the rear output shaft 52.

In other words, when the mode changing mechanism 56 allows the drive gear 57 to rotate together with the rear output shaft 52, the four-wheel drive mode (4WD) is switched on to establish the power transfer path through the rotational power from the transfer input shaft 51 to the rear output shaft 52 is transferred via the drive gear 57, the endless member 59, and the driven gear 58 to the front output shaft 53.

On the other hand, when the mode changing mechanism 56 allows the drive gear 57 to rotate relative to the rear output shaft 52, the two-wheel drive mode (2WD) is switched on to establish the power transfer path through which the rotational power from the transfer input shaft 51 to the rear output shaft 52 is not transferred to the front output shaft 53, and the rotational power is output from only the rear output shaft 52.

—Range Changing Mechanism—

The range changing mechanism 55 selectively establishes one of the low range (L) and the high range (H) for the sub-transmission mechanism 54 in response to an operation that is performed by a driver using, for example, a speed range changing switch (not shown) provided in the vicinity of a driver's seat (not shown).

In the high range (H), a power transfer path is established through the rotational power input to the transfer input shaft 51 is transfer from the sun gear 542 of the sub-transmission mechanism 54 to the rear output shaft 52, i.e., the transfer input shaft 51 is connected directly to the rear output shaft 52.

In the low range (L), a power transfer path is established through which the rotational power input to the transfer input shaft 51 is transferred from the carrier 544 of the sub-transmission mechanism 54 to the rear output shaft 52, i.e., the orbital speed (revolution speed) of the carrier 544 is output to the rear output shaft 52. The speed reduction ratio in the low range is appropriately determined based on the diameters, gear ratios, etc. of parts of the sub-transmission mechanism 54.

The neutral range (N) is neither the low range nor the high range, i.e., a neutral state in which the rotational power input to the transfer input shaft 51 is not transferred to the rear output shaft 52.

As shown in FIGS. 2-4, the range changing mechanism 55 includes a low gear piece 551, a high gear piece 552, a clutch sleeve 553, a shift fork 554, a synchronizer ring 555, a synchro-key 556, etc. The operation of the range changing mechanism 55 is controlled by a transfer shift actuator 60 and a 4WD control computer 300.

The low gear piece 551 is connected to the carrier 544 of the sub-transmission mechanism 54 so that the low gear piece 551 and the carrier 544 can rotate together. The low gear piece 551 is a gear with inner teeth. Specifically, a plurality of inner teeth 551*a* are circumferentially arranged and equally spaced on the inner circumferential surface of the low gear piece 551 at an end portion downstream in a direction in which the rotational power is input.

The high gear piece 552 is integrally formed on a side surface of the sun gear 542 of the sub-transmission mechanism 54, projecting therefrom. The high gear piece 552 is a gear with outer teeth. Specifically, a plurality of outer teeth 552*a* are circumferentially arranged and equally spaced on the outer circumferential surface of the high gear piece 552 in a region close to the sun gear 542.

The clutch sleeve 553 is externally mounted on the rear output shaft 52 via a hub sleeve 558 in a manner that allows the clutch sleeve 553 to rotate together with the rear output shaft 52 and move in the axial direction.

A plurality of outer teeth 553*a* are circumferentially arranged and equally spaced on the outer circumferential surface of the clutch sleeve 553 at an end portion upstream in the direction in which the rotational power is input, and are engaged with the inner teeth 551*a* of the low gear piece 551. A plurality of inner teeth 553*b* are circumferentially arranged and equally spaced on the inner circumferential surface of the clutch sleeve 553 at an end portion upstream in the direction in the rotational power is input, and are engaged with the outer teeth 552*a* of the high gear piece 552.

The teeth 551*a*, 552*a*, 553*a*, and 553*b* are also called splines. The gear pieces 551 and 552 are also called spline pieces.

The low gear piece 551 has a cylindrical shape. The high gear piece 552 is provided inside the cylinder without making contact with the low gear piece 551. The inner teeth 551*a* of the low gear piece 551 are spaced apart from the outer teeth 552*a* of the high gear piece 552 in the axial direction. In the neutral range, the outer and inner teeth 553*a* and 553*b* of the clutch sleeve 553 are provided in a space in the axial direction between the inner teeth 551*a* of the low gear piece 551 and the outer teeth 552*a* of the high gear piece 552, and therefore, are not engaged with the inner teeth 551*a* of the low gear piece 551 and the outer teeth 552*a* of the high gear piece 552.

Figure 12:
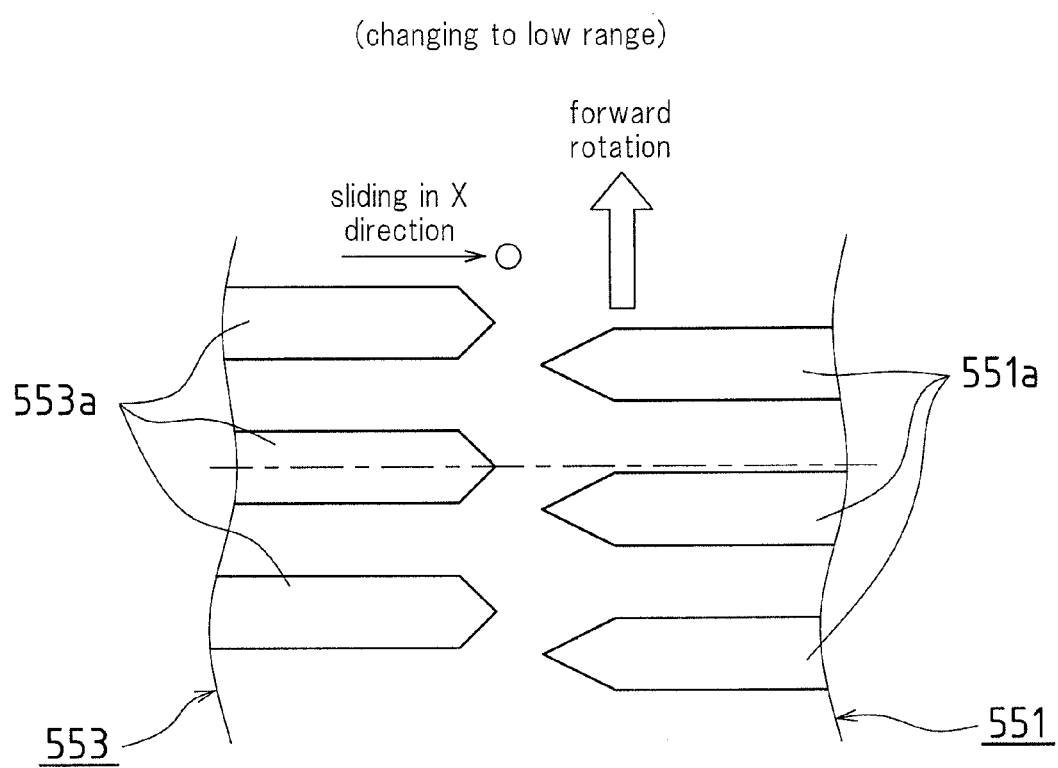
[FIG. 12]
Figure 15:
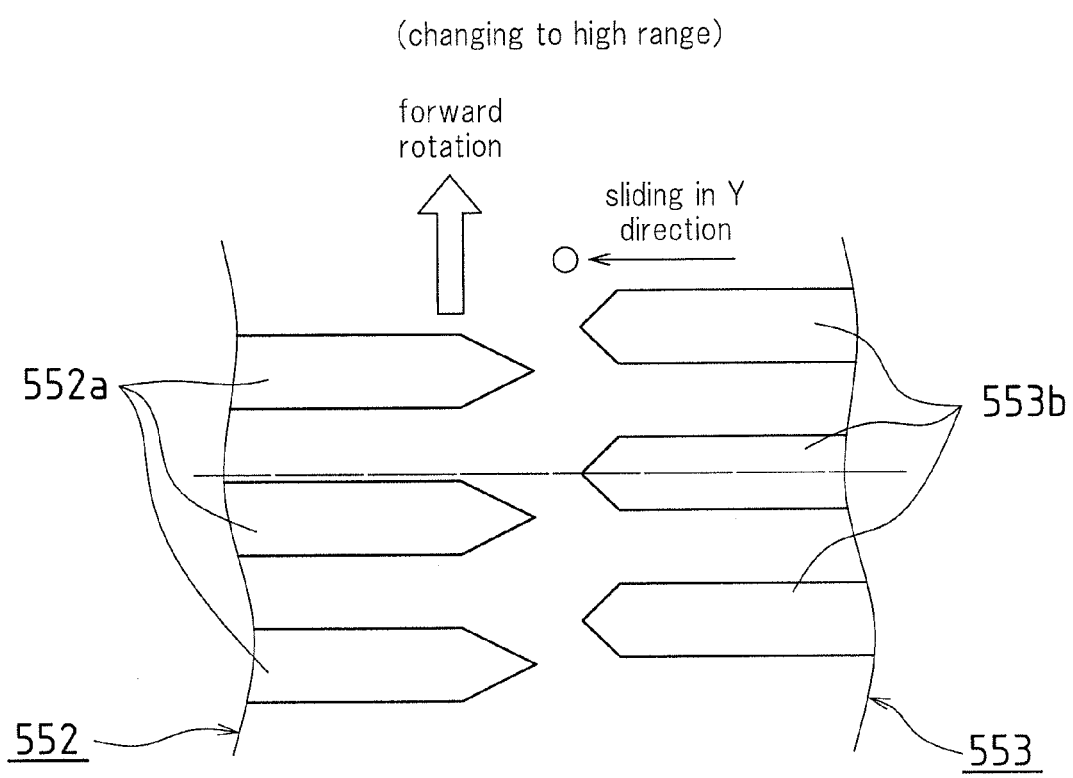
[FIG. 15]

As shown in FIGS. 12 and 15, the inner teeth 551*a* of the low gear piece 551, the outer teeth 552*a* of the high gear piece 552, and the outer and inner teeth 553*a* and 553*b* of the clutch sleeve 553 all have, for example, a double chamfer at a tip thereof in the engagement direction. For example, the double chamfer may be a surface made by beveling the tooth tip into a pointed shape, such as an isosceles triangle, as viewed from the top.

Note that the inner teeth 551a of the low gear piece 551, the outer and inner teeth 553a and 553b of the clutch sleeve 553, and the outer teeth 552a of the high gear piece 552 may have a so-called single chamfer instead of the double chamfer. For example, the single chamfer may be a surface made by beveling the tooth tip into a shape, such as a right triangle, as viewed from the top.

FIG. 12 is a developed view of the inner teeth 551a of the low gear piece 551 and the outer teeth 553a of the clutch sleeve 553 as viewed from the outside (the outer circumference side). FIG. 15 is a developed view of the outer teeth 552a of the high gear piece 552 and the inner teeth 553b of the clutch sleeve 553 as viewed from the outside (the outer circumference side).

The shift fork 554 is used to move the clutch sleeve 553 in the axial direction in parallel to the rear output shaft 52.

The synchronizer ring 555 is pressed against the tapered outer circumferential surface of the high gear piece 552 by the synchro-key 556 moved in association with the sliding in the axial direction of the clutch sleeve 553 when the clutch sleeve 553 is engaged with the high gear piece 552. Friction torque that occurs at a surface on which the synchronizer ring 555 slidably contacts the tapered outer circumferential surface of the high gear piece 552, allows the high gear piece 552 and the clutch sleeve 553 to rotate in synchronization with each other.

Figure 7:
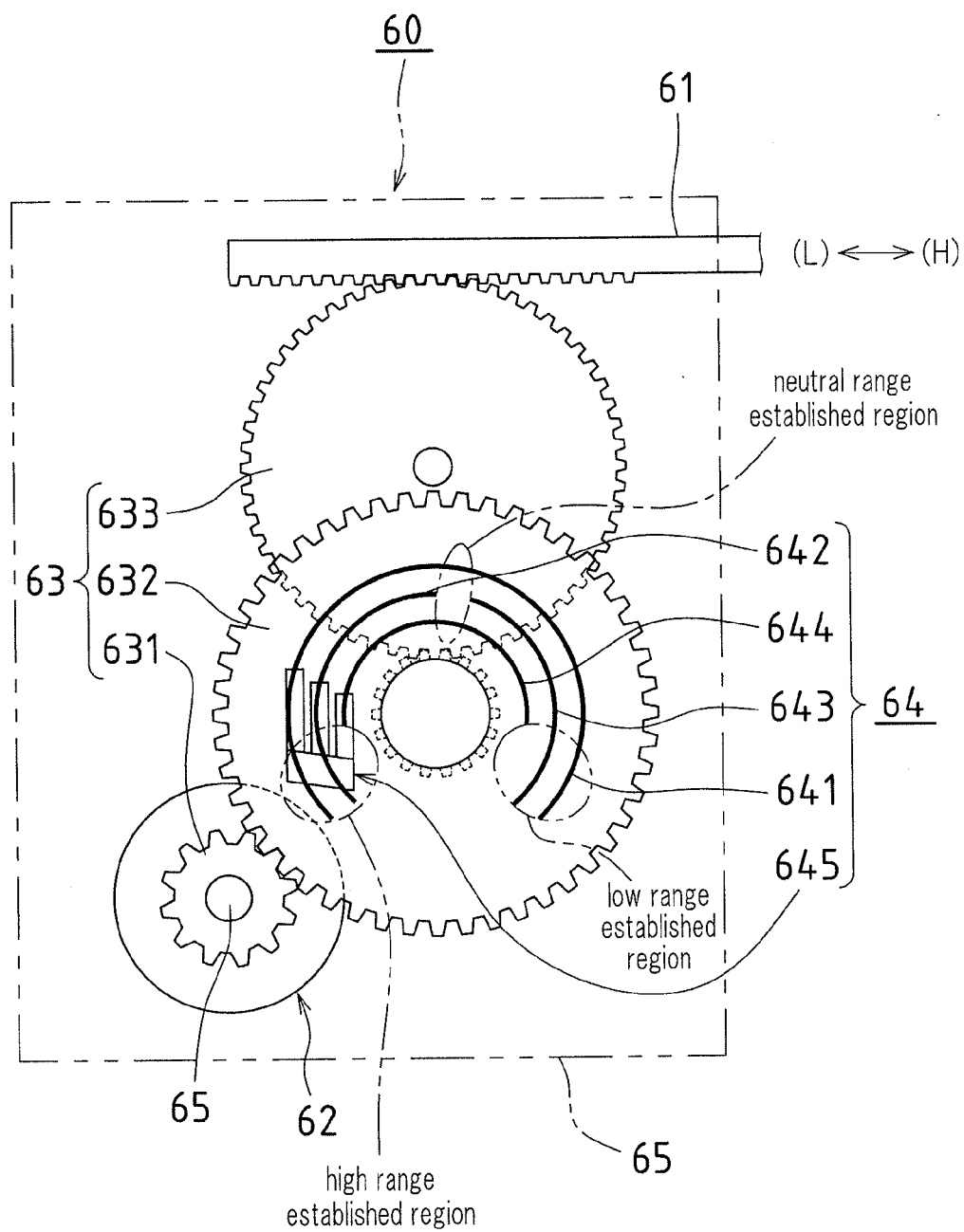
[FIG. 7]

The transfer shift actuator 60 drives the shift fork 554. As shown in FIG. 7, the transfer shift actuator 60 includes a shift fork shaft 61, a shift motor 62, a power transfer mechanism 63, etc. (not shown in detail).

The shift fork shaft 61 is provided to allow the shift fork 554 to move in parallel to a center axis line of the clutch sleeve 553. The shift motor 62 generates rotational power. The power transfer mechanism 63 reduces the rotational power generated by the shift motor 62 and transfers the resultant rotational power to the shift fork shaft 61, thereby sliding the shift fork shaft 61 in the axial direction. The power transfer mechanism 63 includes a combination of a plurality of gears 631, 632, and 633. The shift fork shaft 61 has spur teeth that are engaged with the final gear 633. The final gear 633 and the spur teeth convert the rotational power into linear drive force.

The transfer shift actuator 60 includes a limit switch 64 in order to confirm that the sub-transmission mechanism 54 has changed the ranges.

The limit switch 64 outputs a signal identifying one of the following states: the rotation angle of the output shaft 65 of the shift motor 62 has reached an angle at which the clutch sleeve 553 is completely engaged with the low gear piece 551 [low range (L)]; the rotation angle has reached an angle at which the clutch sleeve 553 is completely engaged with the high gear piece 552 [high range (H)]; the rotation angle has reached an intermediate angle at which the clutch sleeve 553 is not engaged with the low gear piece 551 or the high gear piece 552 [neutral range (N)]; the rotation angle has reached an angle that is located at a region between the neutral range (N) and the low range (L); and the rotation angle has reached an angle that is located at a region between the neutral range (N) and the high range (H).

Figure 8:
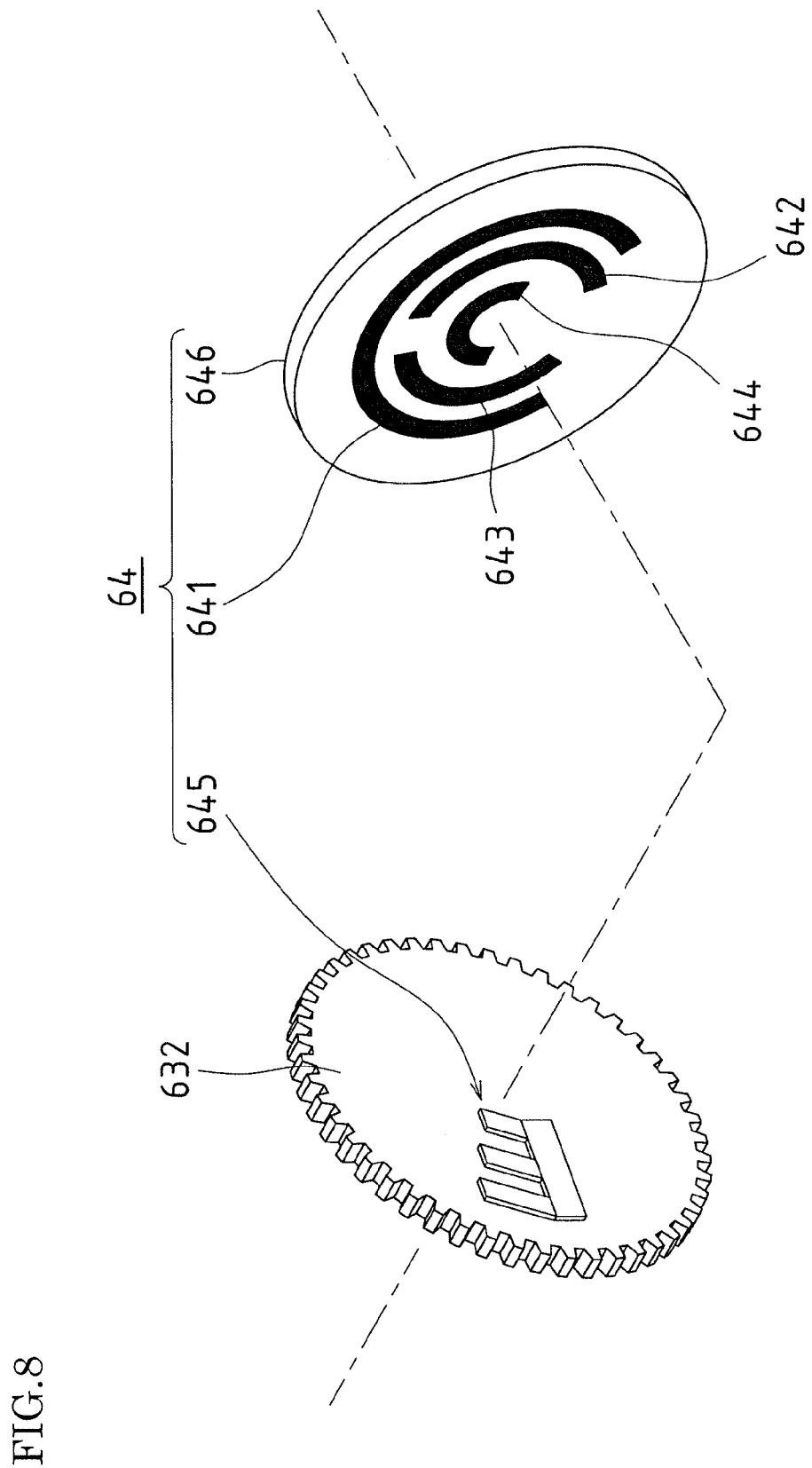
[FIG. 8]
Figures 9, 10:
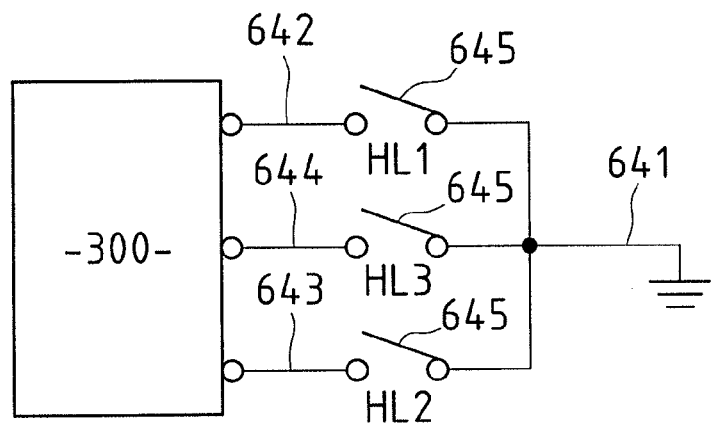
[FIG. 9]
[FIG. 10]

Specifically, as shown in FIGS. 7-9, the limit switch 64 includes a common line 641, three signal lines 642-644, and a contact spring 645, which provide three contact points HL1-HL3.

The common line 641 and the three signal lines 642-644, which are formed of a conductive film formed on a surface of a printed wiring board 646, are fixed to a case 65 of the transfer shift actuator 60 etc. The contact spring 645, which is made of a conductive material, is fixed to one side of the second gear 632 of the power transfer mechanism 63. The contact spring 645 is rotated together with the second gear 632 so that the common line 641 and the first to third signal lines 642-644 are selectively caused to be conductive, depending on the rotation angle of the second gear 632. Note that, in FIG. 7, the printed wiring board 646 is not shown and only the lines 641-644 are shown for ease of understanding a relative position relationship between the lines 641-644 and the contact spring 645.

Note that the common line 641, the first signal line 642, and the contact spring 645 constitute the first contact point HL1. The common line 641, the second signal line 643, and the contact spring 645 constitute the second contact point HL2. The common line 641, the third signal line 644, and the contact spring 645 constitute the third contact point HL3.

When the common line 641 and the first signal line 642 are caused to be conductive by the contact spring 645, the first contact point HL1 is turned "on." When the common line 641 and the first signal line 642 are caused to be non-conductive, the first contact point HL1 is turned "off." When the common line 641 and the second signal line 643 are caused to be conductive by the contact spring 645, the second contact point HL2 is turned "on." When the common line 641 and the second signal line 643 are caused to be non-conductive, the second contact point HL2 is turned "off." When the common line 641 and third signal line 644 are caused to be conductive by the contact spring 645, the third contact point HL3 is turned "on." When the common line 641 and third signal line 644 are caused to be non-conductive, the third contact point HL3 is turned "off."

Next, a relationship between combinations of "on" and "off" of the three contact points HL1-HL3 of the limit switch 64, and the established ranges of the sub-transmission mechanism 54 will be described with reference to a table shown in FIG. 10.

(1) If the first contact point HL1 is "off," the second contact point HL2 is "on," and the third contact point HL3 is "off" (the tips of the protrusions of the contact spring 645 are located in a region where the low range is established in FIG. 7), the 4WD control computer 300 determines that the current range is the "low range (L)."

(2) If the first contact point HL1 is "on," the second contact point HL2 is "off," and the third contact point HL3 is "off" (the tips of the protrusions of the contact spring 645 are located in a region where the high range is established in FIG. 7), the 4WD control computer 300 determines that the current range is the "high range (H)."

(3) If the first contact point HL1 is "off," the second contact point HL2 is "off," and the third contact point HL3 is "on" (the tips of the protrusions of the contact spring 645 are located in a region where the neutral range is established in FIG. 7), the 4WD control computer 300 determines that the current range is the "neutral range (N)."

(4) If the first contact point HL1 is "off," the second contact point HL2 is "on," and the third contact point HL3 is "on," the 4WD control computer 300 determines that the current range is in a "region between the neutral range (N) and the low range (L)."

(5) If the first contact point HL1 is "on," the second contact point HL2 is "off," and the third contact point HL3 is "on," the 4WD control computer 300 determines that the current range is in a "region between the neutral range (N) and the high range (H)."

The combinations of "on" and "off" of the three contact points HL1-HL3 are low range establishment information and high range establishment information described in the appended claims. The limit switch 64 corresponds to a low range detection element and a high range detection element described in the appended claims.

—Control System—

The engine control computer 100, the power management control computer 200, and the 4WD control computer 300 each include a CPU (central processing unit), a ROM (program memory), a RAM (data memory), a backup RAM (non-volatile memory), etc., although not shown.

The ROM stores various control programs, maps that are referenced when the control programs are executed, etc. The CPU executes calculation processes based on the control programs and the maps stored in the ROM. The RAM is a memory that temporarily stores the result of calculation by the CPU, data input from sensors, etc. The backup RAM is a non-volatile memory that stores data to be saved when the engine 1 is stopped, etc.

The 4WD control computer 300 is configured to perform the following controls: a range changing control related to changing of the speed range between the high range (H) and the low range (L) of the sub-transmission mechanism 54 in response to inputting of a range change signal corresponding to a driver's operation of a speed range changing switch (not shown); a mode changing control related to changing of the drive mode between the two-wheel drive mode (2WD) and the four-wheel drive mode (4WD) in response to inputting of a mode change signal corresponding to a driver's operation of a drive mode changing switch (not shown); etc.

Next, an operation of the range changing mechanism 55 will be described. Note that the speed range is allowed to be changed if a condition for allowing changing of the ranges (range change condition) is satisfied. The range change condition may be, for example, that the drive mode is set to the four-wheel drive mode (4WD), that the main transmission mechanism 3 is in the drive range, that the vehicle is stopped, etc.

Figure 5:
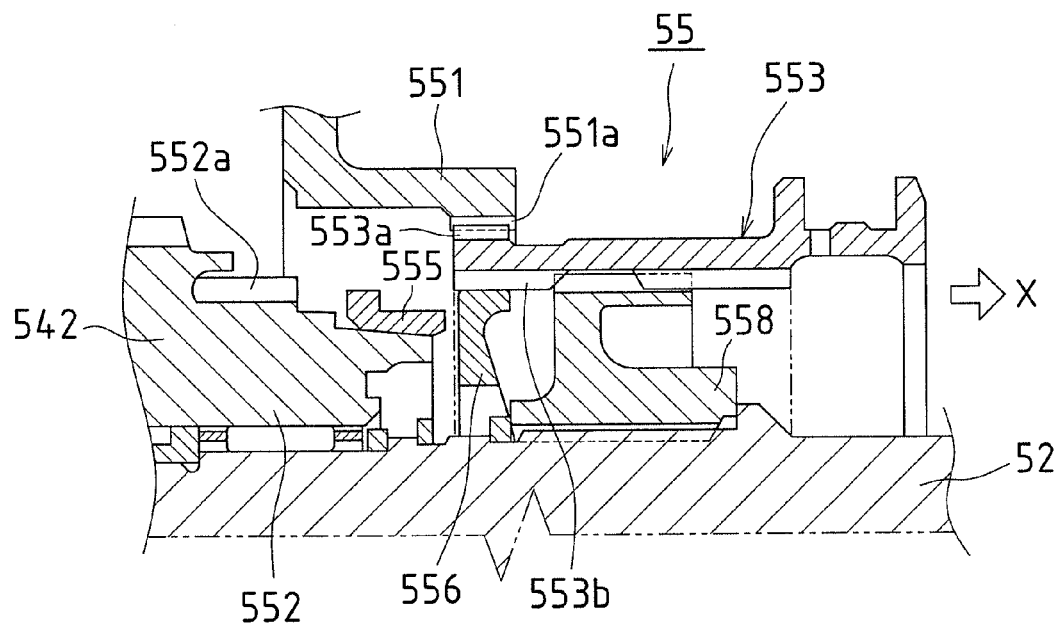
[FIG. 5]

Here, initially, for example, if the speed range changing switch (not shown) selects the low range (L), the 4WD control computer 300 actuates the transfer shift actuator 60 so that the shift fork 554 is moved in a direction indicated by an arrow X in FIG. 4 (to the right on the drawing sheet), whereby the clutch sleeve 553 is slid in the same direction. As a result, as shown in FIG. 5, the outer teeth 553a of the clutch sleeve 553 are engaged with the inner teeth 551a of the low gear piece 551.

As a result, a low-range power transfer path is established through which the rotational power input to the transfer input shaft 51 is transferred to the carrier 544 of the sub-transmission mechanism 54→the clutch sleeve 553→the hub sleeve 558→the rear output shaft 52→the front output shaft 53. Thus, the low range (L) is established.

Figure 6:
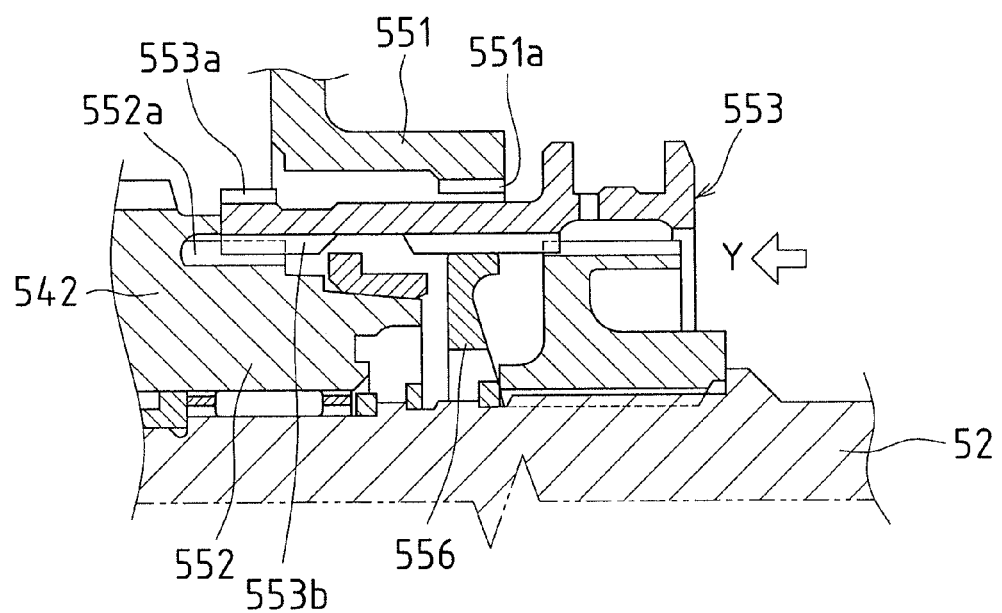
[FIG. 6]

On the other hand, for example, if the speed range changing switch (not shown) selects the high range (H), the 4WD control computer 300 actuates the transfer shift actuator 60 so that the shift fork 554 is moved in a direction indicated by an arrow Y in FIG. 4 (to the left on the drawing sheet), whereby the clutch sleeve 553 is slid in the same direction. As a result, as shown in FIG. 6, the inner teeth 553b of the clutch sleeve 553 are engaged with the outer teeth 552a of the high gear piece 552. During this engagement process, as the clutch sleeve 553 is slid, the synchro-key 556 presses the synchronizer ring 555 against the tapered surface of the high gear piece 552. As a result, friction torque that occurs at a surface on which the synchronizer ring 555 slidably contacts the tapered surface of the high gear piece 552, allows the clutch sleeve 553 and the high gear piece 552 to rotate in synchronization with each other, whereby the inner teeth 553b of the clutch sleeve 553 and the outer teeth 552a of the high gear piece 552 are relatively smoothly engaged with each other.

As a result, a high-range power transfer path is established through which the rotational power input to the transfer input shaft 51 is transferred to the sun gear 542 of the sub-transmission mechanism 54→the clutch sleeve 553→the hub sleeve 558→the rear output shaft 52→the front output shaft 53. Thus, the high range (H) is established.

Note that if the clutch sleeve 553 is at the neutral position at which the clutch sleeve 553 is not engaged with the low gear piece 551 or the high gear piece 552, the rotational power input to the transfer input shaft 51 cannot be transferred to the rear output shaft 52. This is the neutral range (N).

Next, portions to which the present invention is applied will be described in detail with reference to FIGS. 11-17.

When the sub-transmission mechanism 54 is changed to the low range (L) or the high range (H), then if the outer teeth 553a or the inner teeth 553b of the clutch sleeve 553 abut the inner teeth 551a of the low gear piece 551 or the outer teeth 552a of the high gear piece 552, so that the clutch sleeve 553 becomes unable to slide, the clutch sleeve 533 is restored as quickly as possible so that the clutch sleeve 533 can slide, whereby the changing of the ranges can be completed quickly and reliably.

Figure 11:
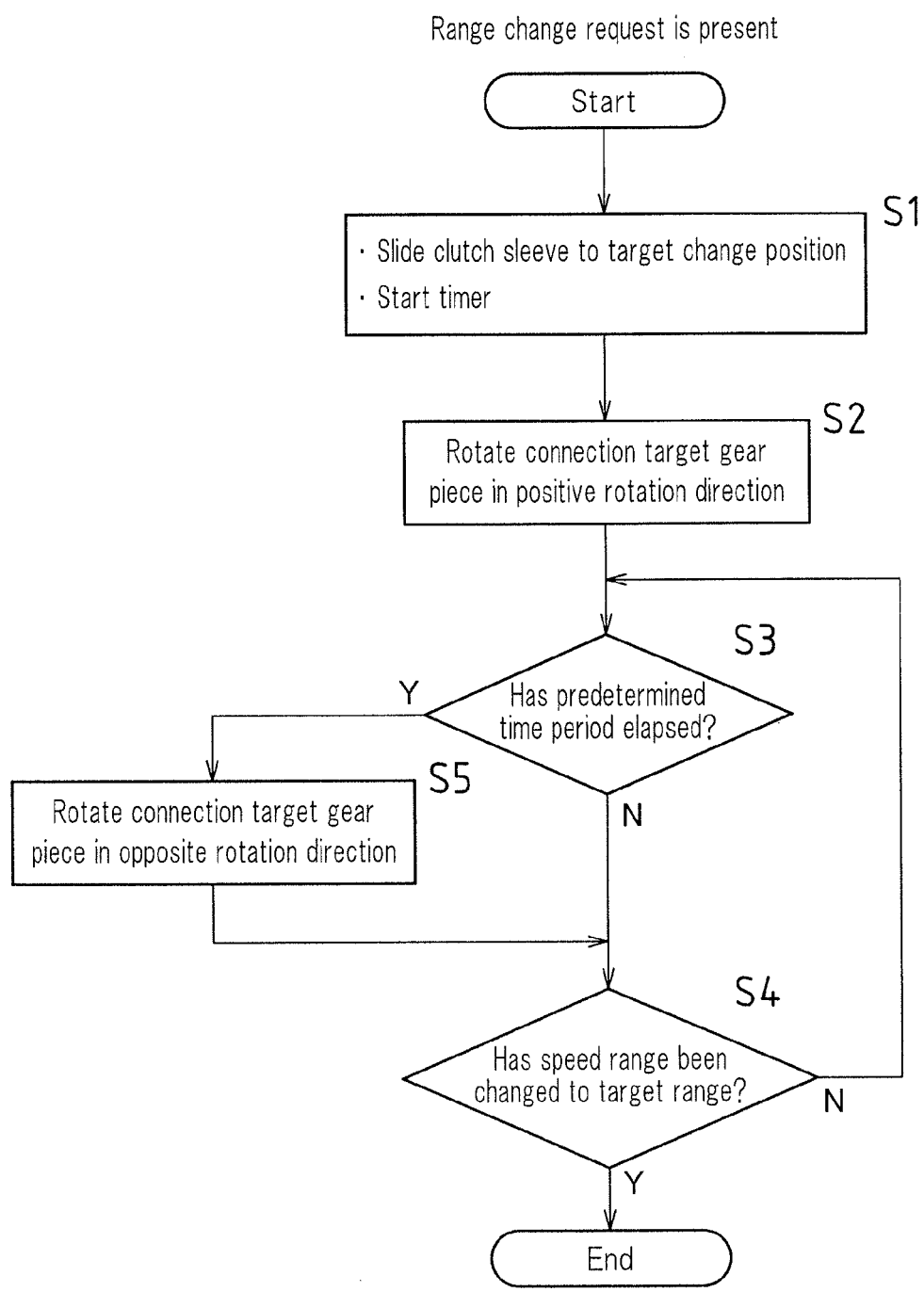
[FIG. 11]

Specifically, an operation during the changing of the ranges in this embodiment will be described with reference to a flowchart shown in FIG. 11. The flowchart of FIG. 11 shows a process in which the 4WD control computer 300 has a dominant role.

The process of the flowchart is started if the range change condition is satisfied when the 4WD control computer 300 receives a range change request. The range change request is performed by, for example, a driver selecting the low range (L) or the high range (H) using the speed range changing switch (not shown).

Initially, in step S1, a timer (time measurement process) of the 4WD control computer 300 is started, and the shift fork actuator 60 slides the clutch sleeve 553 toward a connection target, i.e., a gear piece (551 or 552). A set value for the measurement time of the timer is empirically set based on an experiment etc. to a time required to successfully complete the changing of the ranges.

In the following step S2, the connection target gear piece (551 or 552) is rotated in the positive rotation direction, for example. In this embodiment, the 4WD control computer 300 sends to the power management control computer 200 an instruction to rotate the second motor generator MG2 in the positive rotation direction, so that the second motor generator MG2 rotates the transfer input shaft 51 in the positive rotation direction. In this case, the positive rotational power of the transfer input shaft 51 is transferred through the sub-transmission mechanism 54 to the connection target gear piece (551 or 552), so that the connection target gear piece (551 or 552) is rotated in the positive rotation direction. The positive rotation direction is an input direction (forward drive force) to the sub-transmission mechanism 54.

Note that if the target range is the low range (L), then when the second motor generator MG2 rotates the transfer input shaft 51 in the positive rotation direction, the speed is reduced as the power is transferred through the sun gear 542 of the sub-transmission mechanism 54, the pinion gear 543, and the carrier 544 to the low gear piece 551. As a result, the low gear piece 551 is rotated in the positive rotation direction. On the other hand, if the target range is the high range (H), then when the second motor generator MG2 rotates the transfer input shaft 51 in the positive rotation direction, the speed is not changed as the power is transferred through the sun gear 542 of the sub-transmission mechanism 54 to the high gear piece 552. As a result, the high gear piece 552 is rotated in the positive rotation direction.

Thereafter, in steps S3 and S4, it is monitored or determined whether or not the range changing operation of connecting the clutch sleeve 553 to the connection target gear piece (551 or 552) has been completed within a predetermined period of time. Initially, in step S3, it is determined whether or not a period of time corresponding to the set value has elapsed since the start of measurement by the timer in step S1.

If the determination result of step S3 is negative, i.e., the time period has not elapsed, in the following step S4 it is determined whether or not the speed range has been changed to the target range. The determination of step S4 is performed based on the determination logic (see FIG. 10) of the combinations of "on" and "off" of the three contact points HL1-HL3 of the limit switch 64 included in the transfer shift actuator 60.

If the determination result of step S4 is positive, i.e., the speed range has been changed to the target range, the flowchart is ended. If the determination result of step S4 is negative, i.e., the speed range has not been changed to the target range, control returns to step S3.

On the other hand, if the determination result of step S3 is positive, i.e., the time period has elapsed, control proceeds to step S5.

In step S5, the connection target gear piece (551 or 552) is rotated in the opposite rotation direction, for example. In this embodiment, the 4WD control computer 300 sends to the power management control computer 200 an instruction to cause the second motor generator MG2 to rotate in the opposite rotation direction. As a result, the second motor generator MG2 rotates the transfer input shaft 51 in the opposite rotation direction. As a result, the opposite rotational power of the transfer input shaft 51 is transferred through the sub-transmission mechanism 54 to the connection target gear piece (551 or 552), so that the connection target gear piece (551 or 552) is rotated in the opposite rotation direction. As used herein, the opposite rotation direction means a direction opposite to the direction of the input rotation (forward drive force) to the sub-transmission mechanism 54.

Note that if the target range is the low range (L), then when the second motor generator MG2 rotates the transfer input shaft 51 in the opposite rotation direction, the speed is reduced as the power is transferred through the sun gear 542 of the sub-transmission mechanism 54, the pinion gear 543, and the carrier 544 to the low gear piece 551. As a result, the low gear piece 551 is rotated in the opposite rotation direction. On the other hand, if the target range is the high range (H), then when the second motor generator MG2 rotates the transfer input shaft 51 in the opposite rotation direction, the speed is not changed as the power is transferred through the sun gear 542 of the sub-transmission mechanism 54 to the high gear piece 552. As a result, the high gear piece 552 is rotated in the opposite rotation direction.

After the connection target gear piece (551 or 552) is thus rotated in the opposite direction, control proceeds to step S4, in which it is determined whether or not the speed range has been changed to the target range. If the determination result is positive, the operations of the second motor generator MG2 and the transfer shift actuator 60 are stopped.

Incidentally, in the above range changing control, if the speed range has been changed to the target range before the lapse of the time period measured by the timer (the determination result of step S3 is negative and the determination result of step S4 is positive), the changing of the ranges has been successfully completed, and therefore, the range changing control can be immediately ended.

However, during the above range changing process, if the clutch sleeve 553 becomes unable to slide, and therefore, the changing of the ranges has not been completed even after the lapse of the time period measured by the timer (the determination result of step S3 is positive), the changing of the ranges cannot be successfully completed. In this case, in the step S5, the connection target gear pieces 551 and 552 are rotated in the opposite direction, thereby restoring the clutch sleeve 553 so that the clutch sleeve 533 can slide.

Figure 13:
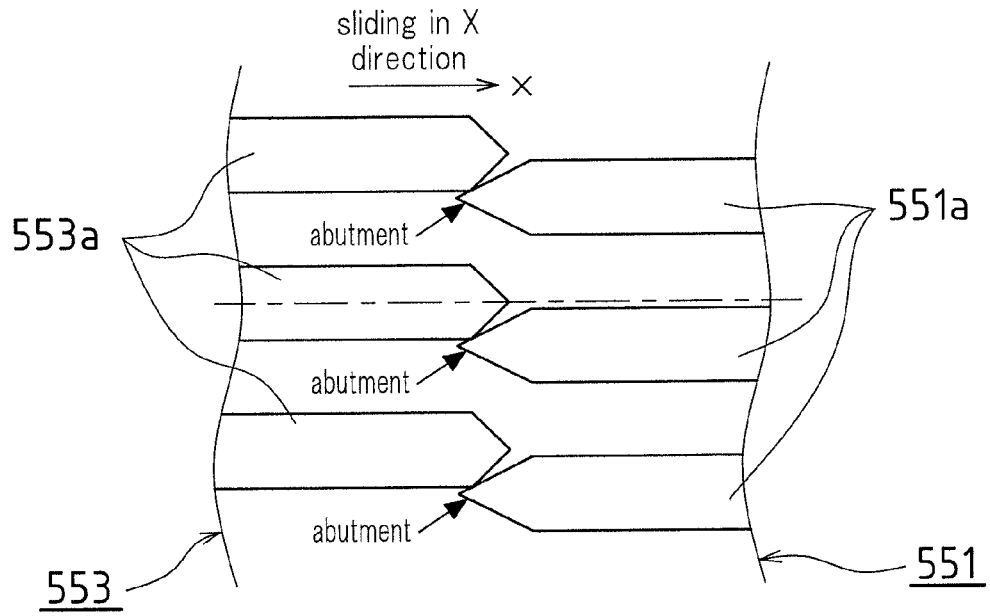
[FIG. 13]
Figure 16:
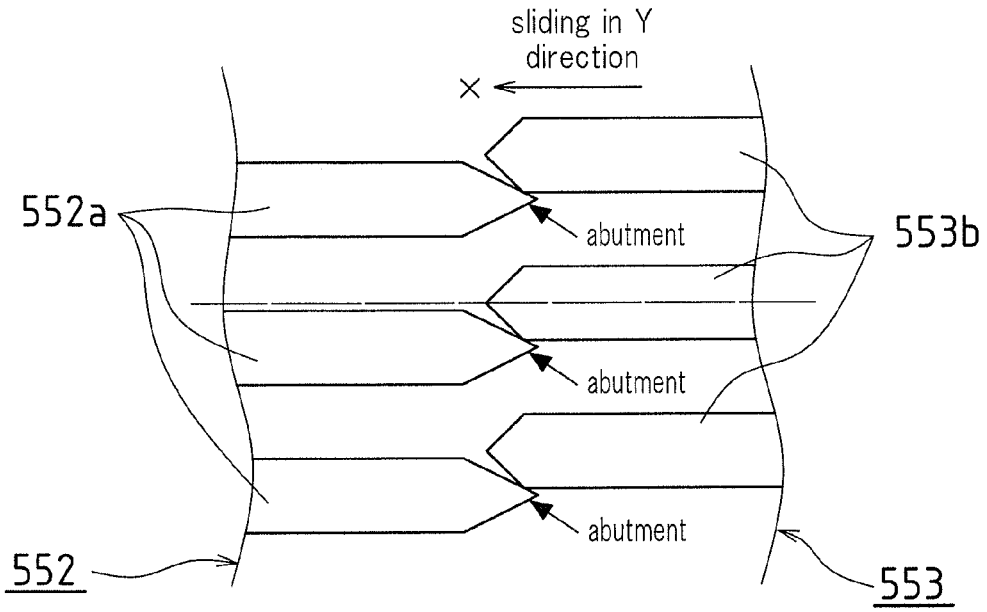
[FIG. 16]

A cause why the clutch sleeve 553 becomes unable to slide is, for example, that if the target range is the low range (L), as shown in FIG. 13 the chamfers of the outer teeth 553a of the clutch sleeve 553 abut the chamfers of the inner teeth 551a of the low gear piece 551 or that if the target range is the high range (H), as shown in FIG. 16 the chamfers of the inner teeth 553b of the clutch sleeve 553 abut the chamfers of the outer teeth 552a of the high gear piece 552.

Figure 14:
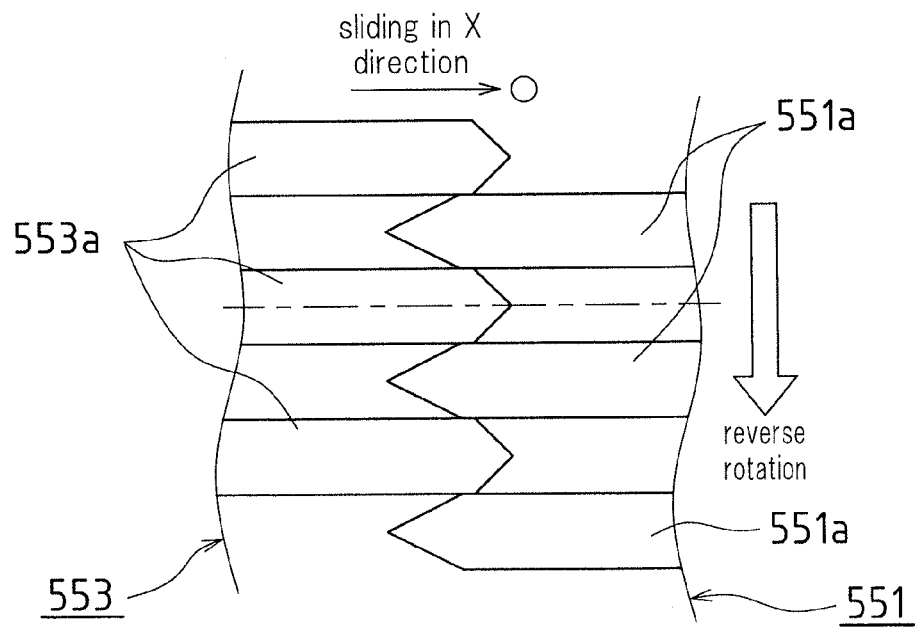
[FIG. 14]
Figure 17:
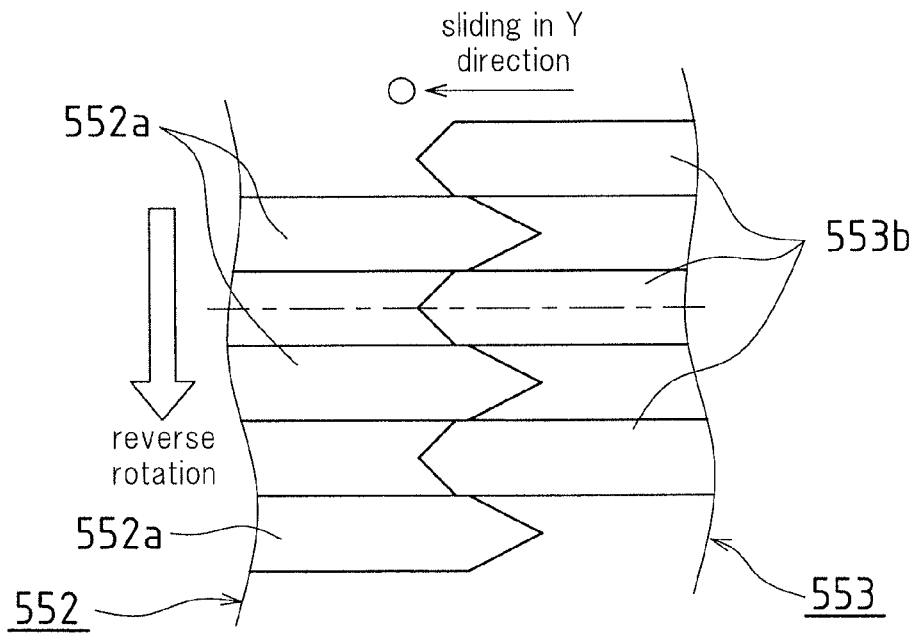
[FIG. 17]

Therefore, if in step S5 the low gear piece 551 or the high gear piece 552 is rotated in the opposite direction, the inner teeth 551a of the low gear piece 551 or the outer teeth 552a of the high gear piece 552 are forcibly displaced with respect to the outer teeth 553a or the inner teeth 553b of the clutch sleeve 553 in the circumferential direction as indicated by an open arrow in FIG. 14 or 17. As a result, the clutch sleeve 553 is allowed to slide, so that as shown in FIG. 14 or 17 the outer teeth 553a or the inner teeth 553b of the clutch sleeve 553 are engaged with the inner teeth 551a of the low gear piece 551 or the outer teeth 552a of the high gear piece 552. If the engagement is confirmed in step S4, the range changing control can be ended.

As described above, in this embodiment of the present invention, when the sub-transmission mechanism 54 of the transfer 5 is changed to the low range (L) or the high range (H), then if the clutch sleeve 553 becomes unable to slide, the clutch sleeve 553 is rotated in the opposite direction.

Here, if a cause why the clutch sleeve 553 becomes unable to slide is, for example, that the outer teeth 553a or the inner teeth 553b of the clutch sleeve 553 abut the inner teeth 551a of the low gear piece 551 or the outer teeth 552a of the high gear piece 552, the clutch sleeve 553 is rotated in the opposite direction, so that the tooth tip of the connection target gear piece 551 or 552 is displaced from the tooth tip of the clutch sleeve 553 in the circumferential direction.

Therefore, the clutch sleeve 553 can be restored as quickly as possible so that the clutch sleeve can slide, whereby the required range is established. As a result, the reliability of the range changing operation can be improved.

Incidentally, another cause why the clutch sleeve 553 becomes unable to slide is, for example, that the drive system or the control system is out of order. In such a case, the 4WD control computer 300 etc. can be used to, for example, issue a warning that the ranges cannot be changed, using a display device in the vicinity of a driver's seat.

A correspondence relationship between the components of the vehicle drive device of the above embodiment and components described in claim 1 will be described. The sub-transmission mechanism 54 of the transfer 5 corresponds to a transmission mechanism described in claim 1. The range changing mechanism 55 corresponds to a range changing mechanism described in claim 1. The second motor generator MG2 corresponds to a motor generator described in claim 1. The 4WD control computer 300 and the power management control computer 200 correspond to a control device described in claim 1. Note that if the 4WD control computer 300 and the power management control computer 200 are implemented as a single computer, this single computer corresponds to the control device described in claim 1. An actuation processor described in claim 1 corresponds to steps S1 and S2 of FIG. 11. A determination processor described in claim 1 corresponding to steps S3 and S4 of FIG. 11. A handler described in claim 1 corresponds to step S5 of FIG. 11.

Note that the present invention is not intended to be limited to the above embodiment. It will be obvious that various changes and modifications may be made without departing the scope of the present invention.

(1) In the above embodiment, the vehicle drive device includes the two motor generators MG1 and MG2. The present invention is not limited to this. The present invention is applicable to a vehicle drive device that includes a single motor generator or a vehicle drive device that does not include the engine 1 and includes only a motor generator as a drive source.

(2) In the above embodiment, during the range changing process, if the clutch sleeve 553 becomes unable to slide, the gear piece 551 or 552 that is selected by the second motor generator MG2 is rotated in the positive direction and in the opposite direction to restore the clutch sleeve 553. The present invention is not limited to this. The present invention encompasses a situation that if the clutch sleeve 553 becomes unable to slide, the first motor generator MG1 rotates the connection target gear piece 551 or 552 in the positive direction and in the opposite direction to restore the clutch sleeve 553.

Figure 18:
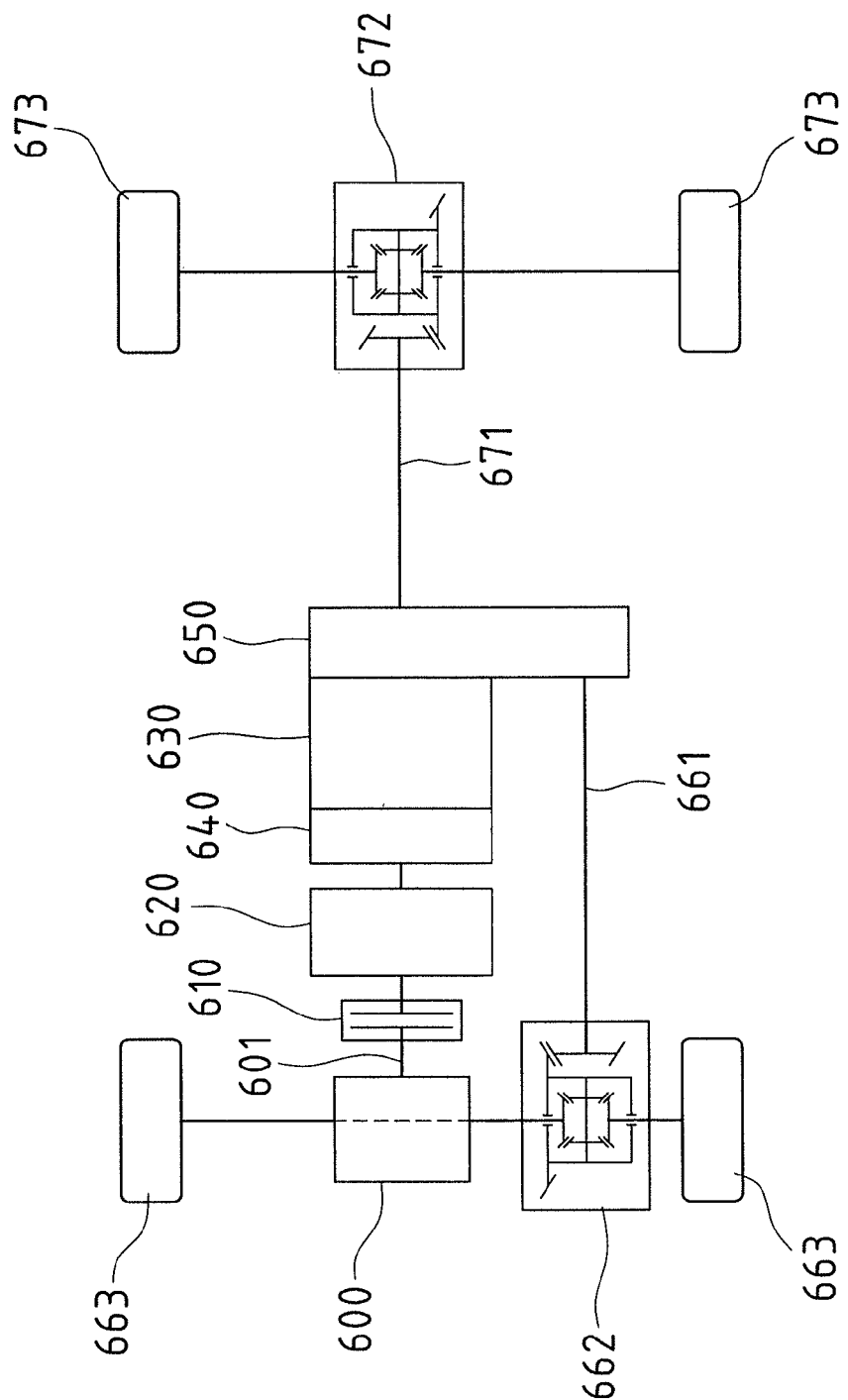
[FIG. 18]

(3) In the above embodiment, the engine 1 and the hybrid transmission 2 are connected together via the damper 12 in the vehicle drive device. The present invention is not limited to this. The present invention is also applicable to a four-wheel-drive vehicle drive device shown in FIG. 18, for example.

In this vehicle drive device, a motor generator 620 is connected via a clutch 610 to a crank shaft 601 of an engine 600. An input shaft (pump impeller shaft) of a main transmission mechanism 630 with a torque converter 640 is connected to a rotor of the motor generator 620. A transfer 650 is connected to an output shaft of the main transmission mechanism 630. Drive force is transferred from the transfer 650 through a front propeller shaft 661 and a front differential 662 toward front wheels 663, while drive force is transferred through a rear propeller shaft 671 and a rear differential 672 toward rear wheels 673. Although not shown, the transfer 650 includes the sub-transmission mechanism 54 and the range changing mechanism 55 described in the above embodiment, etc. The output shaft of the main transmission mechanism 630 is connected to the input shaft of the sub-transmission mechanism 54.

A range changing control that is performed when the present invention is applied to such a vehicle drive device will be described.

Specifically, when a vehicle is stopped, then if the engine 600 is actuated, the clutch 610 is connected, and the main transmission mechanism 630 is caused to be in the drive range, slight dragging torque occurs due to the torque converter 640. The dragging torque is transferred as vehicle forward drive force (positive rotational power) from the main transmission mechanism 630 to a low gear piece (541) or a high gear piece (542) of a sub-transmission mechanism (54) of the transfer 650.

Therefore, in the vehicle drive device of this embodiment, if the second motor generator MG2 is actuated as in step S2 of the flowchart of FIG. 11, the process of inputting the positive rotational power to the connection target low gear piece (551) or high gear piece (552) is no longer required. Instead, it is necessary to perform the process of actuating the engine 600, connecting the clutch 610, and causing the main transmission mechanism 630 to be in the drive range.

Thereafter, in step S5 of the flowchart of FIG. 11, the motor generator 620 is used as an actuation source that rotates the connection target gear piece 551 or 552. In addition, in this case, rotational power that has a direction opposite to the dragging torque and overcomes the dragging torque is generated in the motor generator 620 and input to the connection target gear piece (551 or 552) in the sub-transmission mechanism (54) of the transfer 650.

Such an embodiment can provide advantages similar to those of the above embodiment.

Figure 19:
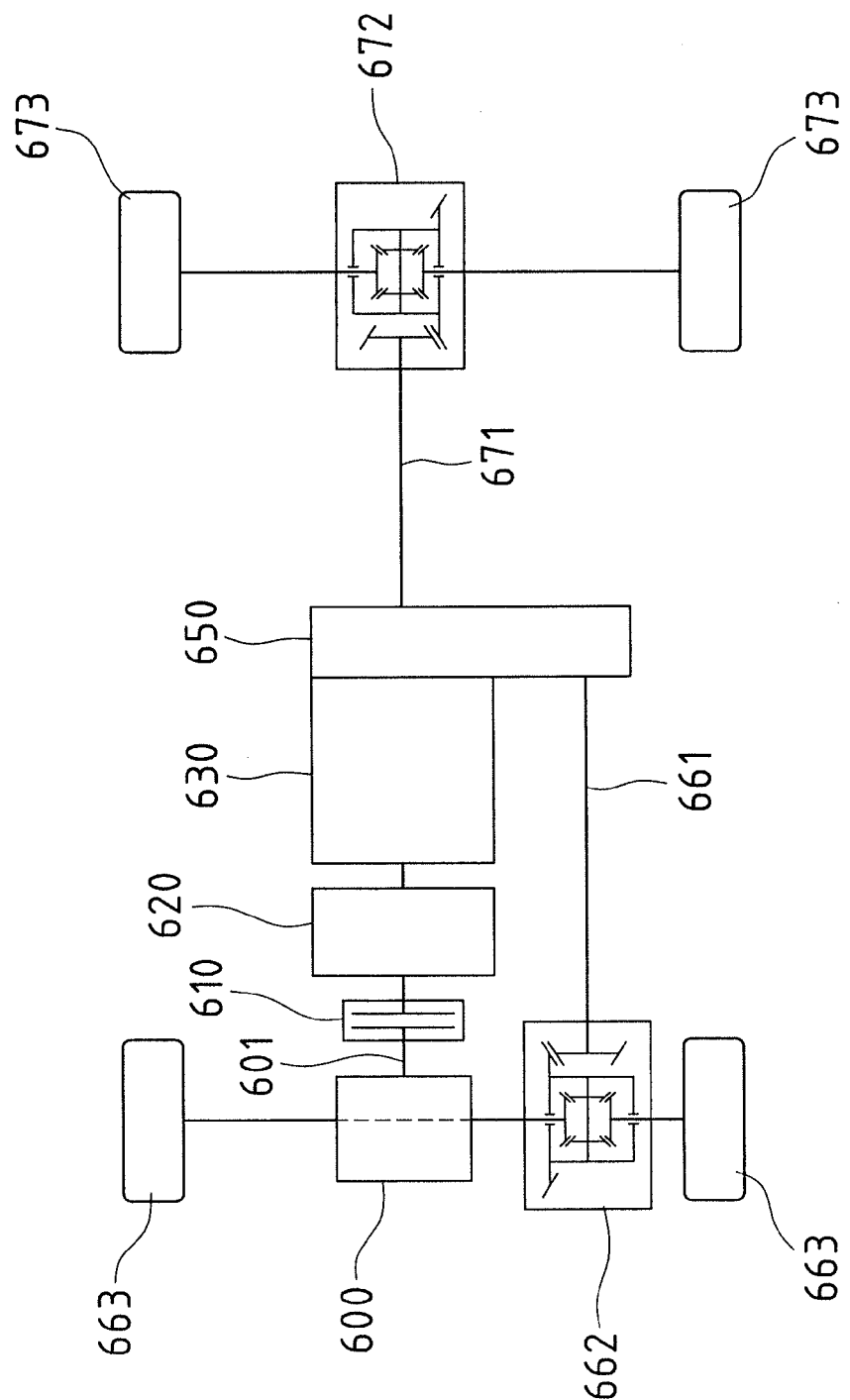
[FIG. 19]

(4) In the above embodiment, the engine 1 and the hybrid transmission 2 are connected together via the damper 12 in the vehicle drive device. The present invention is not limited to this. The present invention is also applicable to a four-wheel-drive vehicle drive device shown in FIG. 19, for example.

In this vehicle drive device, a motor generator 620 is connected via a clutch 610 to a crank shaft 601 of an engine 600. An input shaft of a main transmission mechanism 630 is connected to a rotor of the motor generator 620. A transfer 650 is connected to an output shaft of the main transmission mechanism 630. Drive force is transferred from the transfer 650 through a front propeller shaft 661 and a front differential 662 toward front wheels 663, while drive force is transferred through a rear propeller shaft 671 and a rear differential 672 toward rear wheels 673. Although not shown, the transfer 650 includes the sub-transmission mechanism 54 and the range changing mechanism 55 described in the above embodiment, etc.

A range changing control that is performed when the present invention is applied to such a vehicle drive device will be described.

Specifically, when a vehicle is stopped, and the ranges are changed for the sub-transmission mechanism of the transfer 650, then if the clutch 610 is released irrespective of the actuation and stoppage of the engine 600, processes similar to those of FIG. 11 described in the above embodiment can be performed. In the case of the vehicle drive device of this embodiment, in steps S2 and S5 of FIG. 11 the motor generator 620 is used as an actuation source that rotates the connection target gear piece 551 or 552.

Such an embodiment can provide advantages similar to those of the above embodiments.

[Industrial Applicability]

The present invention can be preferably used in a vehicle drive device that includes a transmission mechanism that selectively establishes one of a low range and a high range, a range changing mechanism that changes the ranges of the transmission mechanism, a motor generator that inputs drive force to the transmission mechanism, and a control device that controls the changing of the ranges.

[Reference Signs List]
1 engine
2 hybrid transmission
3 power split device
4 main transmission mechanism
5 transfer
51 transfer input shaft
52 rear output shaft
53 front output shaft
54 sub-transmission mechanism
55 range changing mechanism
551 low gear piece 551a inner teeth of low gear piece
552 high gear piece
552a outer teeth of high gear piece
553 clutch sleeve
553a outer teeth of clutch sleeve
553b inner teeth of clutch sleeve
554 shift fork
558 hub sleeve
56 mode changing mechanism
60 transfer shift actuator
61 shift fork shaft
62 shift motor
63 power transfer mechanism
64 limit switch
100 engine control computer
200 power management control computer
300 4WD control computer

The invention claimed is:

1. A vehicle drive device including a transmission mechanism that selectively establishes one of a low range and a high range, a range changing mechanism that changes the ranges of the transmission mechanism, a motor generator that inputs drive force to the transmission mechanism, and a control device that controls the changing of the ranges, wherein
the range changing mechanism includes a low gear piece and a high gear piece that are arranged and spaced apart in an axial direction, a clutch sleeve that is slidably arranged in the axial direction so as to be engaged with one of the two gear pieces, and a shift actuator that slides the clutch sleeve either forward or backward in the axial direction to be connected to one of the gear pieces, and when the clutch sleeve is connected to the low gear piece, a low-range power transfer path is established, and when the clutch sleeve is connected to the high gear piece, a high-range power transfer path is established,
the control device includes
an actuation processor that rotates the connection target gear piece in the same direction as a direction of input rotation to the transmission mechanism in response to a range change request when a vehicle is stopped, and slides the clutch sleeve,
a determination processor that determines whether or not the clutch sleeve has become unable to slide during the process of sliding the clutch sleeve, and
a handler that, when the determination processor determines that the clutch sleeve has become unable to slide, causes the motor generator to rotate the connection target gear piece in a direction opposite to the direction of the input rotation to the transmission mechanism.

2. The vehicle drive device according to claim 1, wherein the actuation processor causes the motor generator to rotate the connection target gear piece in the same direction as the direction of the input rotation to the transmission mechanism in response to the range change request, before causing the shift actuator to slide the clutch sleeve.

3. The vehicle drive device according to claim 2, wherein a second motor generator and a main transmission mechanism are provided between the motor generator and an input shaft of the transmission mechanism, and an engine is provided between the second motor generator and the motor generator via a power split device.

4. The vehicle drive device according to claim 1, wherein a second motor generator and a main transmission mechanism are provided between the motor generator and an input shaft of the transmission mechanism, and an engine is provided between the second motor generator and the motor generator via a power split device.

5. The vehicle drive device according to claim 1, wherein a main transmission mechanism with a torque converter is provided between an input shaft of the transmission mechanism and an output shaft of the motor generator, and an engine is provided upstream from the motor generator via a clutch.

6. The vehicle drive device according to claim 5, wherein the actuation processor causes the connection target gear piece to rotate in the same direction as the direction of the input rotation to the transmission mechanism by dragging torque of the torque converter in response to the range change request, before causing the shift actuator to slide the clutch sleeve.

7. The vehicle drive device according to claim 1, wherein the shift actuator includes a shift fork shaft that allows the clutch sleeve to slide, a shift motor that generates rotational power, a power transfer mechanism that moves the shift fork shaft in an axial direction thereof using the rotational power generated by the shift motor, a low range detection element that outputs low range establishment information when a rotation angle of an output shaft of the shift motor reaches an angle at which the clutch sleeve is completely engaged with the low gear piece, and a high range detection element that outputs high range establishment information when the rotation angle of the output shaft of the shift motor reaches an angle at which the clutch sleeve is completely engaged with the high gear piece, and
the determination processor determines whether or not a target range has been established, based on output information from the detection elements, before a predetermined period of time has elapsed since reception of the range change request, and if the result of the determination is negative, determines that the clutch sleeve has become unable to slide.

8. The vehicle drive device according to claim 1, wherein the transmission mechanism is a planetary gear set including a sun gear that receives input rotation, a non-rotating ring gear, a plurality of pinion gears provided between and engaged with the sun gear and the ring gear, and a carrier that supports the pinion gears in a manner that allows the pinion gears to rotate freely and is rotated in synchronization with an orbital motion of the pinion gears, and
the carrier is allowed to rotate together with the low gear piece, and the sun gear is allowed to rotate together with the high gear piece.

9. The vehicle drive device according to claim 1, wherein the low gear piece is a gear with inner teeth, the high gear piece is a gear with outer teeth and provided inside the low gear piece without making contact with the low gear piece, and the clutch sleeve includes outer teeth that are allowed to engage with the inner teeth of the low gear piece and inner teeth that are allowed to engage with the outer teeth of the high gear piece.

* * * * *